(12) United States Patent
Gross et al.

(10) Patent No.: US 6,839,655 B2
(45) Date of Patent: Jan. 4, 2005

(54) SYSTEM FOR MONITORING NON-COINCIDENT, NONSTATIONARY PROCESS SIGNALS

(75) Inventors: Kenneth C. Gross, LaJolla, CA (US); Stephan W. Wegerich, Glendale Heights, IL (US)

(73) Assignee: University of Chicago, Chicago, IL (US)

( * ) Notice: Subject to any disclaimer, the term of this patent is extended or adjusted under 35 U.S.C. 154(b) by 51 days.

(21) Appl. No.: 09/865,953

(22) Filed: May 25, 2001

(65) Prior Publication Data

US 2003/0028349 A1 Feb. 6, 2003

(51) Int. Cl.[7] .................... G06F 101/14; G06F 17/18
(52) U.S. Cl. .................................................. 702/179
(58) Field of Search ..................... 702/71, 179, 182, 702/183, 185, 190, 191; 700/29, 30; 714/736; 340/146.2, 500

(56) References Cited

U.S. PATENT DOCUMENTS

| | | | |
|---|---|---|---|
| 5,223,207 A | 6/1993 | Gross et al. | 376/216 |
| 5,253,186 A | 10/1993 | Lipner et al. | 364/551.01 |
| 5,271,045 A | 12/1993 | Scarola et al. | 376/216 |
| 5,287,390 A | 2/1994 | Scarola et al. | 376/216 |
| 5,311,562 A | 5/1994 | Palusamy et al. | 376/215 |
| 5,351,200 A | 9/1994 | Impink, Jr. | 364/550 |
| 5,375,150 A | 12/1994 | Scarola et al. | 376/216 |
| 5,459,675 A | 10/1995 | Gross et al. | 364/492 |
| 5,485,491 A | 1/1996 | Salnick et al. | 376/245 |
| 5,517,422 A | 5/1996 | Ilic et al. | 364/492 |
| 5,528,516 A | 6/1996 | Yemini et al. | 364/551.01 |
| 5,629,872 A | 5/1997 | Gross et al. | 364/554 |
| 5,634,039 A | 5/1997 | Simon et al. | 395/500 |
| 5,689,696 A | 11/1997 | Gibbons et al. | 395/601 |
| 5,719,796 A | 2/1998 | Chen | 364/578 |
| 5,745,382 A | 4/1998 | Vilim et al. | 364/551.01 |
| 5,748,496 A | 5/1998 | Takahashi et al. | 364/550 |
| 5,761,090 A | 6/1998 | Gross et al. | 364/551.01 |
| 5,764,509 A | 6/1998 | Gross et al. | 364/149 |
| 5,774,379 A | 6/1998 | Gross et al. | 364/576 |
| 5,862,054 A | 1/1999 | Li | 364/468.28 |
| 5,971,580 A | 10/1999 | Hall et al. | 364/188 |
| 5,987,399 A | 11/1999 | Wegerich et al. | 702/183 |
| 6,049,578 A | 4/2000 | Senechal et al. | 376/215 |
| 6,066,179 A | 5/2000 | Allan | 716/4 |
| 6,107,919 A | 8/2000 | Wilks et al. | 340/511 |
| 6,134,510 A | 10/2000 | Deco et al. | 702/179 |
| 6,202,038 B1 | 3/2001 | Wegerich et al. | 702/183 |

*Primary Examiner*—Michael Nghiem
(74) *Attorney, Agent, or Firm*—Foley & Lardner LLP

(57) ABSTRACT

An improved system for monitoring non-coincident, non-stationary, process signals. The mean, variance, and length of a reference signal is defined by an automated system, followed by the identification of the leading and falling edges of a monitored signal and the length of the monitored signal. The monitored signal is compared to the reference signal, and the monitored signal is resampled in accordance with the reference signal. The reference signal is then correlated with the resampled monitored signal such that the reference signal and the resampled monitored signal are coincident in time with each other. The resampled monitored signal is then compared to the reference signal to determine whether the resampled monitored signal is within a set of predesignated operating conditions.

15 Claims, 19 Drawing Sheets

— RAW DATA
-- EDGE THRESH

— SMOOTH DATA
• LEADING EDGE
▷ TRAILING EDGE

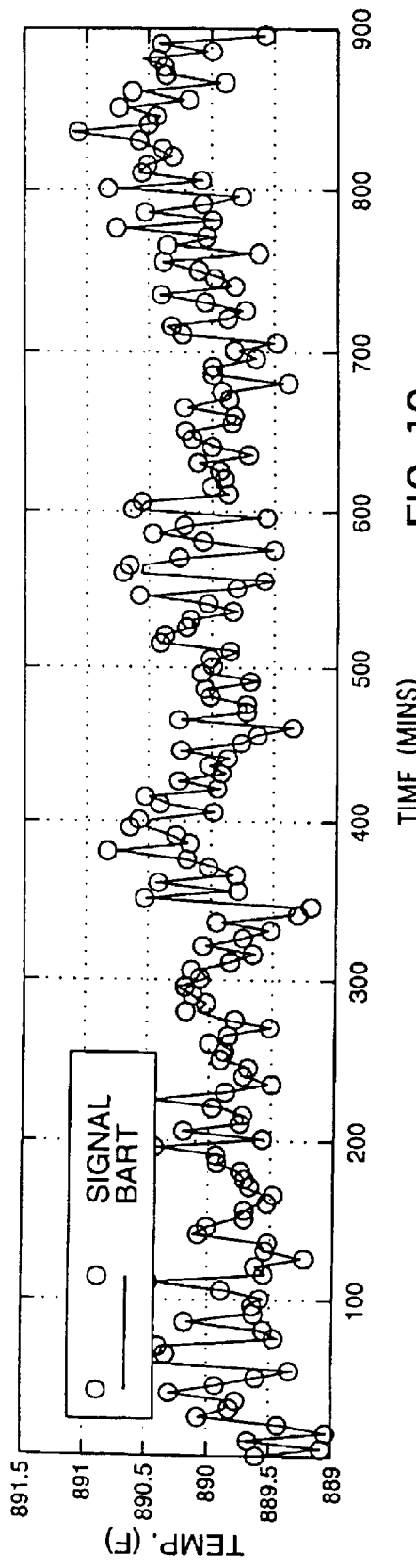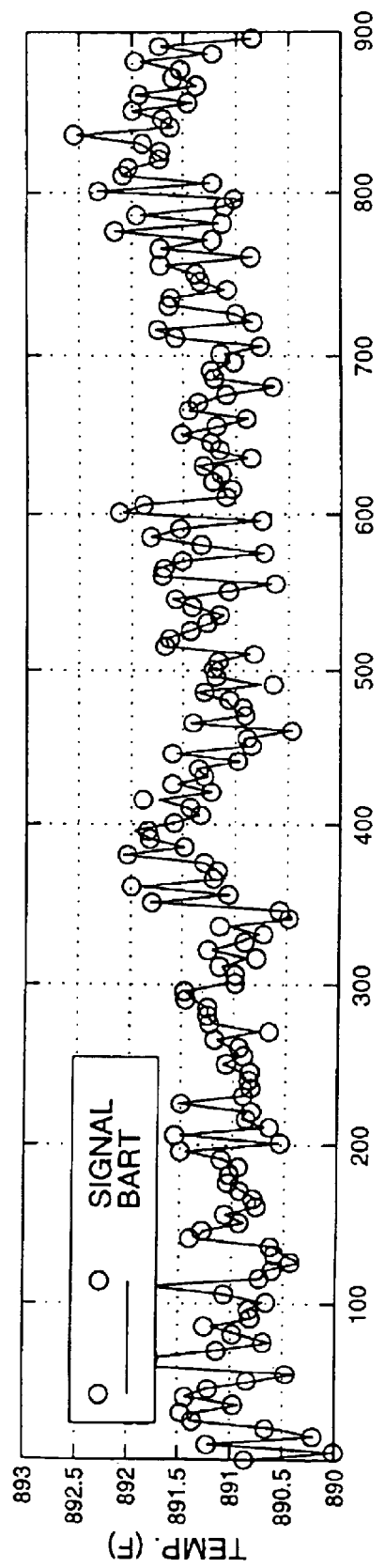

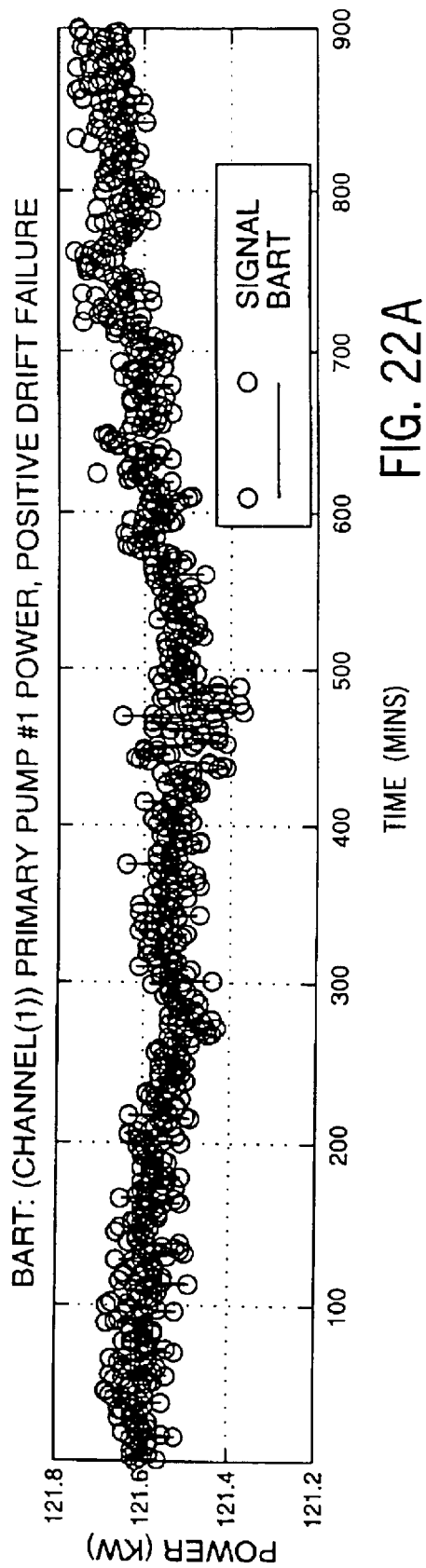
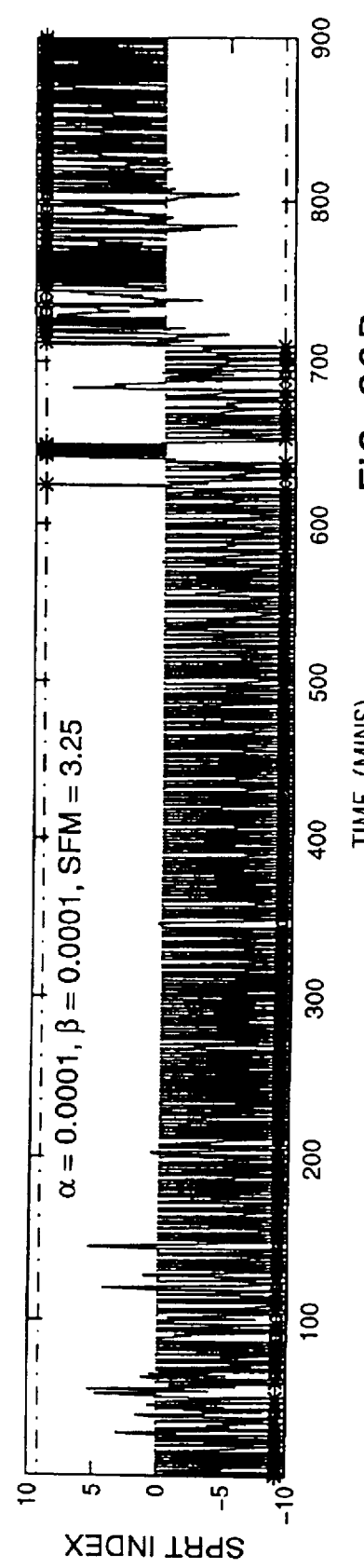
FIG. 22A
FIG. 22B

SYSTEM FOR MONITORING NON-COINCIDENT, NONSTATIONARY PROCESS SIGNALS

This invention was made with government support under Contract No. W-31-109-ENG-38 awarded to the Department of Energy. The Government has certain rights in this invention.

BACKGROUND OF THE INVENTION

This invention relates generally to a system for monitoring non-coincident, nonstationary process signals. More particularly, this invention relates to a system for monitoring non-coincident, nonstationary process signals used in detecting deficiencies in various stages of manufacturing processes, biological process and the like.

There is often a need or desire to monitor finite length, non-stationary signals that may include repetitive deterministic artifacts that are non-coincident in time. This phenomenon occurs, for example, in many engineering systems that contain moving parts that are monitored by digitizing sensors monitoring signals relevant to the quality of those parts.

For example, an assembly line where the thickness of manufactured plastic or metal components might be measured. In such an example, every component passing through the sensor produces a signal that has a shape that is substantially similar to the preceding signal—but the signal may be longer or shorter depending upon the speed of the conveyor belt. Another example would be the force applied to the die set in a metal stamping machine. Once again, a signal representing this force would possess a similar shape with every repetition of the machine's movement. The length of the force signal, however, may be longer or shorter depending upon how fast the machine is operating. Biological signals may also produce signals with repetitive deterministic artifacts. One such example includes the use of cardiac signals from a biological heart monitored from EKG traces.

In each of the foregoing cases, if one were to digitize and then plot the monitored signals, the length of the repetitive deterministic artifacts would vary from part to part or from cycle to cycle, depending upon the speed and variability of the system or organism being monitored. A reference signal can often be used to compare to these repetitive signal waveforms for detection of anomalies, but only if their lengths are exactly the same. If their lengths are not the same, large discrepancies between the reference signal and the input signal would be seen due to the signals not being coincident. Such discrepancies could result in an erroneous diagnosis.

SUMMARY OF THE INVENTION

It is therefore an object of the invention to develop an improved method for monitoring non-coincident and non-stationary process signals.

It is a further object of the invention to develop an improved system for monitoring non-stationary, non-coincident process signals of a definite length.

It is yet another object of the invention to develop an system for monitoring non-coincident, non-stationary process signals that correspond to a manufacturing process.

It is yet another object of the invention to develop an system for monitoring non-coincident, non-stationary process signals that correspond to a biological process, such as signals emanating from a biological heart.

In accordance with the above objects, a system is provided including a series of steps for developing a reference and for characterizing an input signal or signals for meaningful comparison with the reference. The first step includes the use of a training sequence for determining a mean and variance of a reference wave form and to define a reference wave form length. The leading and falling edges of the repetitive deterministic artifacts are determined in the monitored signal and to calculate the sample length. The monitored signal is then resampled to properly correlated with the reference signal, and the two signals are arranged such that they are coincident in time. The monitored signal is then shifted with respect to the sequence signal so that the monitored signal has the same number of samples as the reference length identified in the first step. The adjusted monitored signal is then compared to the stored reference signal.

These and other objects, advantages and features of the invention together with the organization and manner of operation thereof will become apparent from the following detailed description when taken into conjunction with the accompanying drawings wherein like elements have like numerals throughout the drawings described below.

BRIEF DESCRIPTION OF THE DRAWINGS

FIG. 19 shows channel 8 subassembly outlet temperature 2B11 under normal operating conditions and modelled BART;

FIG. 20 illustrates channel 9 subassembly outlet temperature 4E1 under normal operating conditions;

FIG. 22A shows an EBR-II primary pump power signal with an imposed positive drift;

FIG. 22B shows an application of SPRT to the signal of FIG. 22A;

DETAILED DESCRIPTION OF THE INVENTION

In order to illustrate embodiments of the invention, wherein the monitored signal and the reference signal comprise a repetitive waveforms, an explanation is provided to generally describe the methodology and function for the systematic procedure of the invention and then the stepwise algorithmic approach is presented in detail. Although the manner in which the phenomena are described is one rigorous approach which explains the operation of the invention for those skilled in the art, other conventional mathematical and theoretical explanations can also be used to describe similar results which characterize embodiments of the invention. The invention is therefore not limited to the description of its operation by following illustrative mathematical explanations.

Figure 1:
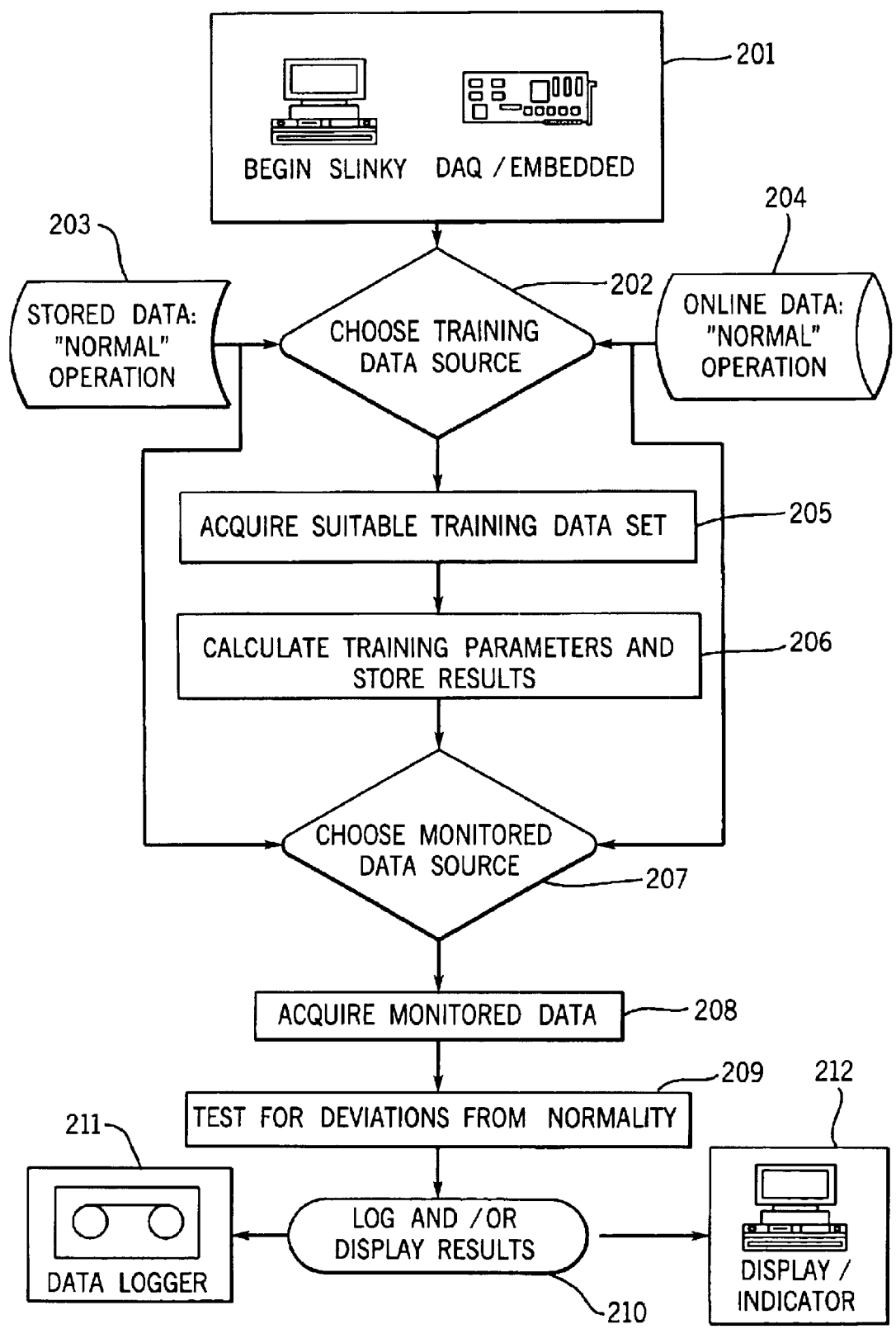
FIG. 1 is a depiction of the overall operation of an example system of the present invention.

The present invention involves the use of a step-wise procedure for monitoring a plurality of repetitive signals. FIG. 1 depicts the overall operation of one embodiment of a system of the present invention. The system runs on a computer or is embedded into monitoring hardware 201. Before data are analyzed using the system, a training data source must be selected, shown at 202. The selection can be an on-line or real-time source 204, or it can be a storage media source 203. Once the source has been selected, data are collected for building the trained reference patterns, shown at 205, and the results are stored at 206. The training data are fed into the training module, shown at 208 and all pertinent parameters and reference patterns are calculated.

After the training process completes steps 201–206, the data source for monitoring is selected, shown at 207. Again, the selection can be an on-line or real-time source, shown at 204, or it can be a storage media source, shown at 203. Next, data are acquired for analysis, shown at 208, from the chosen source. The acquired data are fed as input to the system monitoring module, shown at 209, which determines whether or not the input data are deviating from the trained normal conditions. The results from the monitoring module are directed at 210 to one or both of a data logging system, shown at 211, and/or a terminal display or monitoring indication mechanism, represented at 212.

Figure 2:
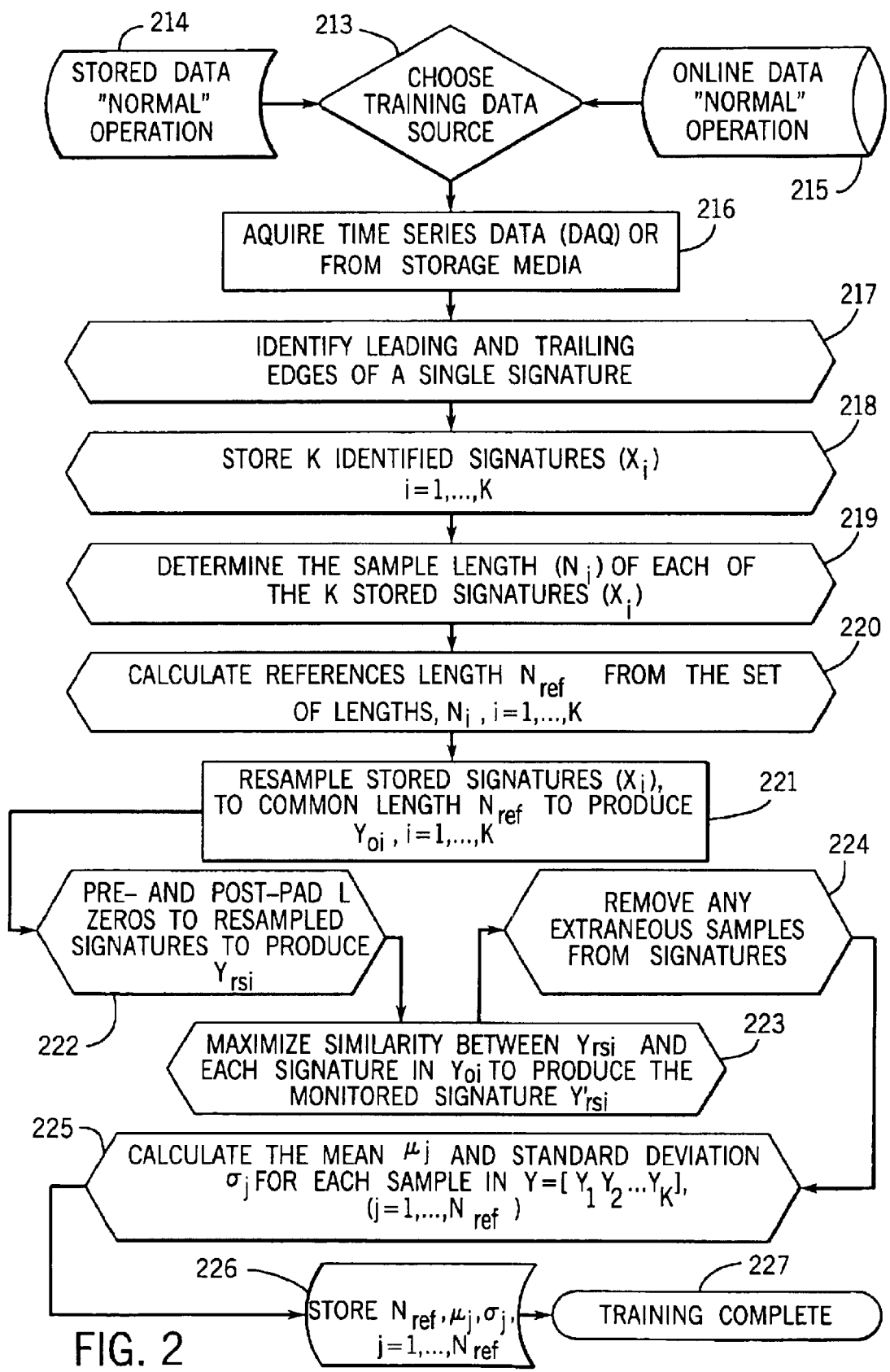
FIG. 2 is an illustration of detailed training module steps for the system of FIG. 1 according to one embodiment.

FIG. 2 illustrates the detailed training module steps for one form of a system of the present invention. First, a training data source is selected at 213. The selection can be an on-line or real-time source, shown at 215, or it can be a storage media source, shown at 214. The data are read into memory either via data acquisition (DAQ) hardware or from storage media at 216 depending on the choice made in step 213.

Figure 4A:
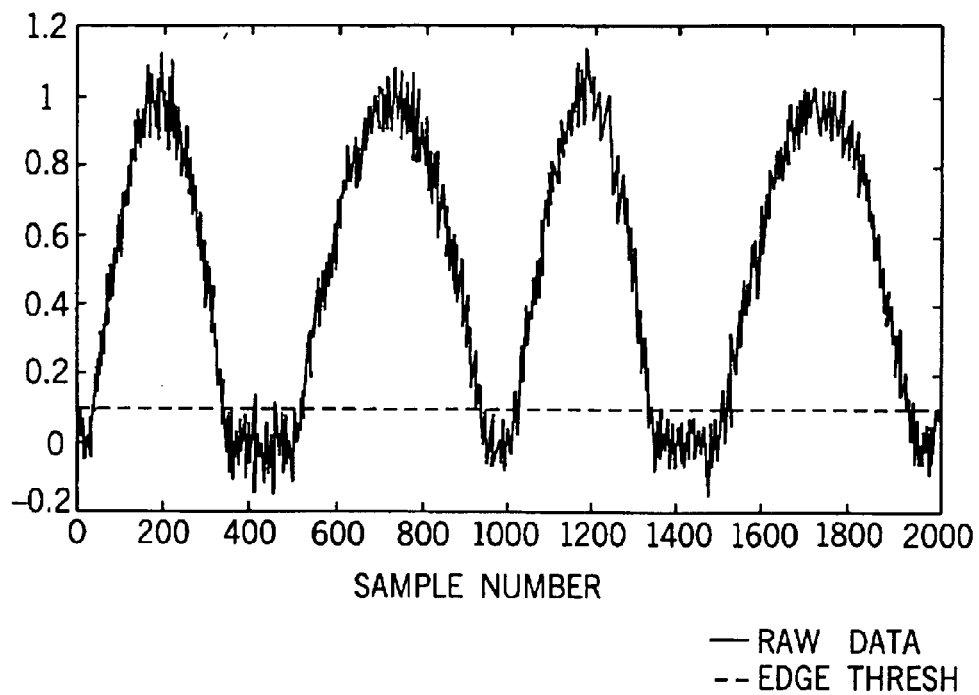
FIG. 4A shows an example of a raw data set from a repetitive process.
Figure 4B:
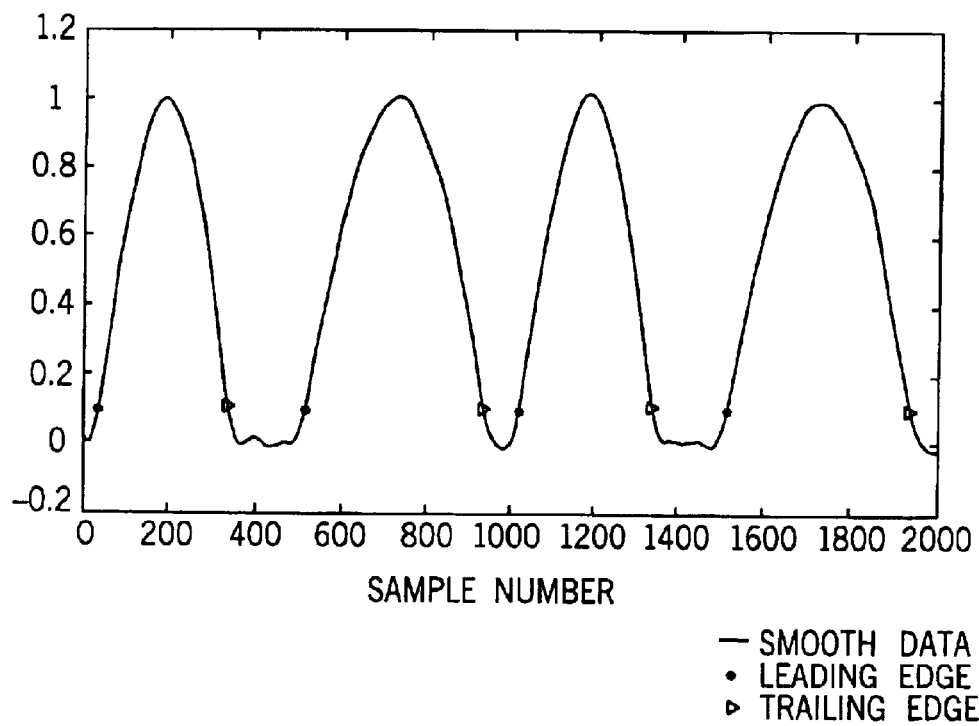
FIG. 4B shows the raw data sequence smoothed using the Savitzky-Golay filter.
Figure 5A:
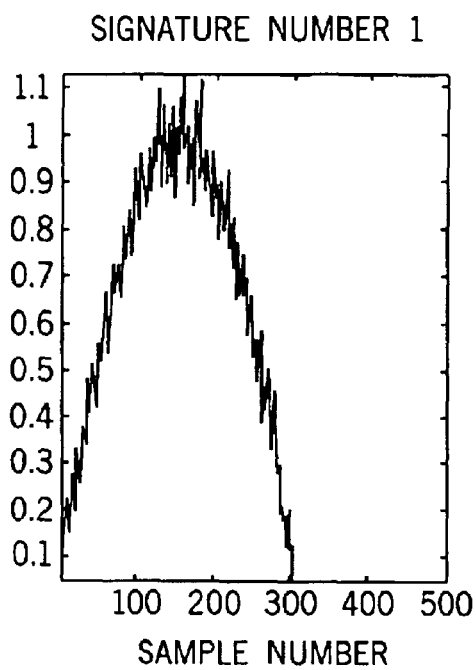
FIGS. 5A–5D show each of the identified signatures as they have been identified and extracted from the original data stream.
Figure 5B:
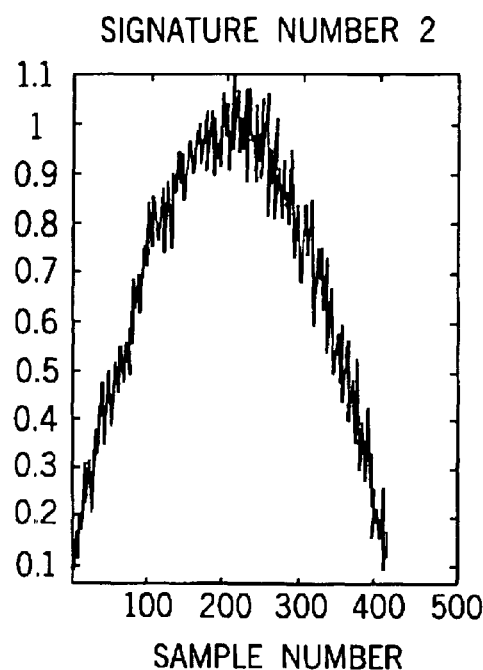
Figure 5C:
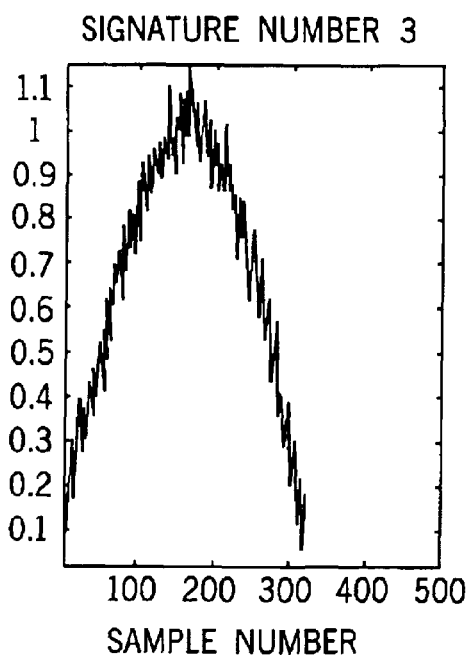
Figure 5D:
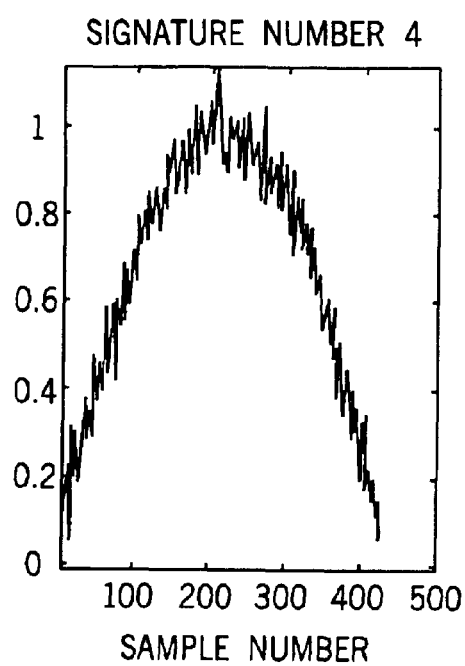

The first data processing step, shown at 217, is a method for determining the leading and trailing edges of each individual signature in the input. An example of this procedure is illustrated in FIGS. 4A–4B and 5A–5D. FIG. 4A shows an example of a raw data set from a repetitive process. The threshold is used to mark the leading edge and trailing edges of each of the four signatures in the data sequence. Because the data is noisy, unique identifiers for the leading and trailing edges are impossible to find using this threshold. One method of overcoming this problem, however, is illustrated in FIG. 4B. The raw data sequence is smoothed using a well-known smoothing algorithm called the Savitzky-Golay filter. Much of the noise is suppressed using the Savitzky-Golay filter so that the threshold can be used effectively to identify the leading and trailing edges of each signature. The markers in FIG. 4B show where each of the edges was identified. FIGS. 5A–5D show each of the identified signatures as they have been identified and extracted from the original data stream.

The next step in the training procedure is to store a plurality of identified signatures in computer or embedded memory 218. As each signature is extracted from the training data set its sample length is measure and stored as well, shown at 219. Then a reference length $N_{ref}$ is calculated from all of the measured signature lengths at 220. The reference length can be determined from the minimum, maximum, median or mean of the plurality of measured signature lengths.

Figure 6:
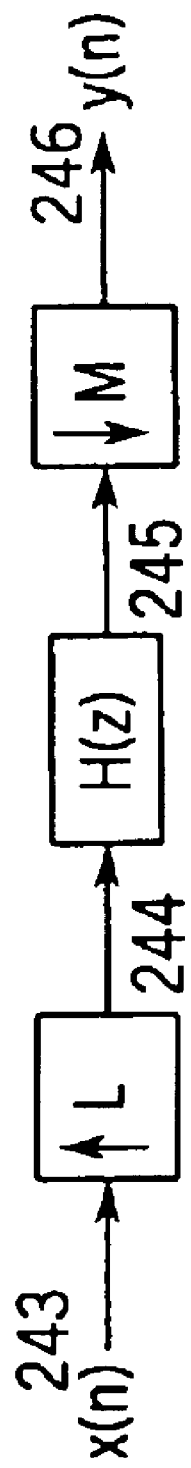
FIG. 6 shows the basic methodology for re-sampling using a digital fractional re-sampling filter.

The reference length $N_{ref}$ is used to determine the re-sampling rate applied to each stored signature so that the lengths of all signatures are the same, represented at 221. The re-sampling is accomplished using a digital fractional re-sampling filter. The basic structure of the filter is shown in FIG. 6. If the raw input signature or data sequence represented by x(n) at 243 has an original length of N, then the signature is re-sampled using the re-sampling filter to produce a new signature of length $N_{ref}$. First x(n) is fed through an expander at 244 that inserts $N_{ref}$ zeros between each original sample. Then a low-pass anti-aliasing filter 245, is applied to the resulting zero padded data sequence acting as an interpolator. The interpolated sequence is then decimated at 246 by a factor of N to produce the desired length of $N_{ref}$ for output signature y(n). In cases where N and $N_{ref}$ are large, may be more efficient to first simplify the ratio $N_{ref}/N$ to their equivalent ratio of smallest integer (i.e., 40/30=4/3).

In step 222 the re-sampled signatures are padded on both sides with a plurality of zeros. Each new re-sampled signature is compared with all previously processed signatures using a vector similarity calculation defined to be between 0 and 1 (1 for identical and 0 for no similarity) at step 223. The new signature is shifted forward and/or backward until the similarity is maximized, ensuring that the signatures optimally line up with one another. After the signatures have been lined up, the extraneous samples on both ends of the signature are removed at 224.

The next step in the training process is to calculate the mean and standard deviation for each sample in the $N_{ref}$ length signatures producing $N_{ref}$ mean values and $N_{ref}$ standard deviation values, shown at 225. The parameter $N_{ref}$ and the vectors of mean values and standard deviation values are stored for use during the monitoring phase of operation at 226 and the training is completed at step 227.

Figure 3:
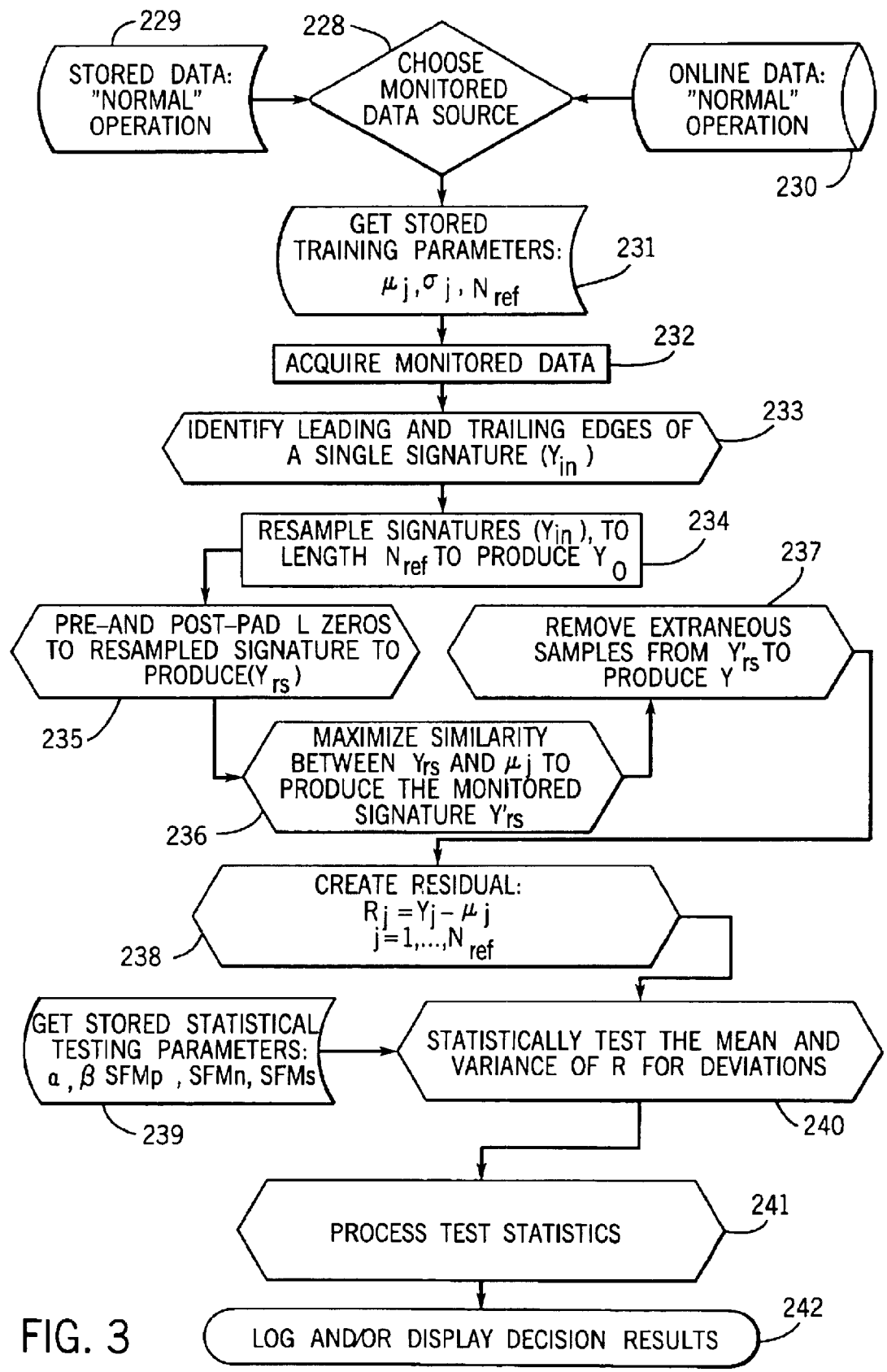
FIG. 3 illustrates the detailed monitoring module steps for the system of FIG. 1.

FIG. 3 illustrates the detailed monitoring module steps for the system of the present invention. First, a monitored data source is selected at 228. The selection can be an on-line or real-time source, shown at 230, or it can be a storage media source, represented at 229. Next the training parameters; mean values ($\mu$), standard deviation values ($\sigma$), and reference length $N_{ref}$, are loaded into memory at 231 and the monitored data are read into memory either via data acquisition (DAQ) hardware or from storage media depending on the choice made in step 228.

The leading and trailing edges of each signature present in the monitored data are identified sequentially at 233 using the procedure described during the training phase step 217. The signatures are re-sampled to equalize their lengths in step 234 using the same procedure as in step 221. The similarity optimization at 235, 236 and 237 is used to line the monitored signature with the reference mean, $\mu$ calculated during step 225 of the training phase. A number of similarity measurement techniques may be used. In one embodiment of the invention, a bounded angle ratio test (BART) is used as the similarity measurement technique. The BART system is discussed in detail in U.S. patent application Ser. No. 09/373,326, incorporated herein by reference. It is also possible to use other systematic methods for the third step 520. For example, one could measure the distance between two Euclidean vectors as a possible technique. The details of the most preferred BART measurement technique are described below.

The re-sampled and lined up signature is then differenced with the mean value vector to produce the residual vector R in step 238. In a particular embodiment of the invention, this is accomplished using a non-stationary sequential probability ratio test (SPRT). The SPRT system is discussed in detail in U.S. Pat. No. 5,223,207 and incorporated herein by reference. A SPRT decision ratio is then calculated to determine whether the monitored signal falls outside of normal operating conditions. This monitoring procedure can continue in real-time for the remainder of the operating run. Alternatively, the procedure can continue until a user decides to retrain the automated system.

Parameter settings for the detection engine 240 are set manually before monitoring begins or are loaded from a stored data file that can be used over and over at step 239. The results of the detection engine 240 are then processed in step 241 to determine the amount of deviation in the monitored signatures from the trained reference signature. The processing step produces an alert if the deviation is greater than a user specified amount (SFMp-positive deviation, SFMn-negative deviation, SFMs-standard deviation change) with a confidence level determined by specified false ($\alpha$) and missed alarm ($\beta$) probabilities. The alert is then logged and/or displayed in the final step of the monitoring process at 242.

As described above, a non-stationary sequential probability ratio test (SPRT) is preferably used to compare the adjusted monitored signal to the stored reference signals. In one example of the method, SPRT teaches a expert system and method to determine the degradation of nuclear reactant coolant pumps and their respective sensors prior to failure.

Figure 7:
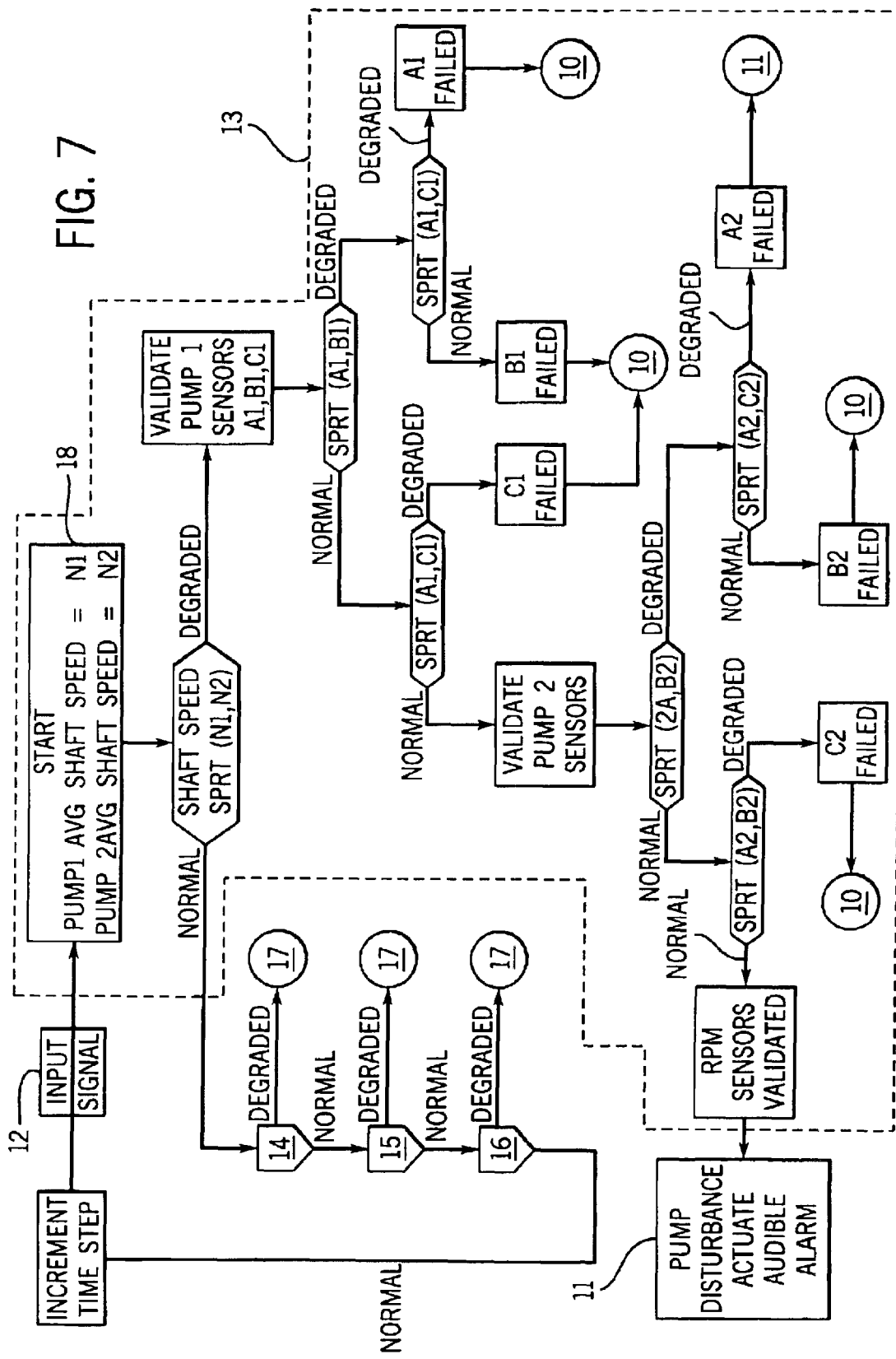
FIG. 7 is a depiction of the logic diagram for an expert pump-surveillance system operated in accordance with an embodiment of the invention.
Figure 8:
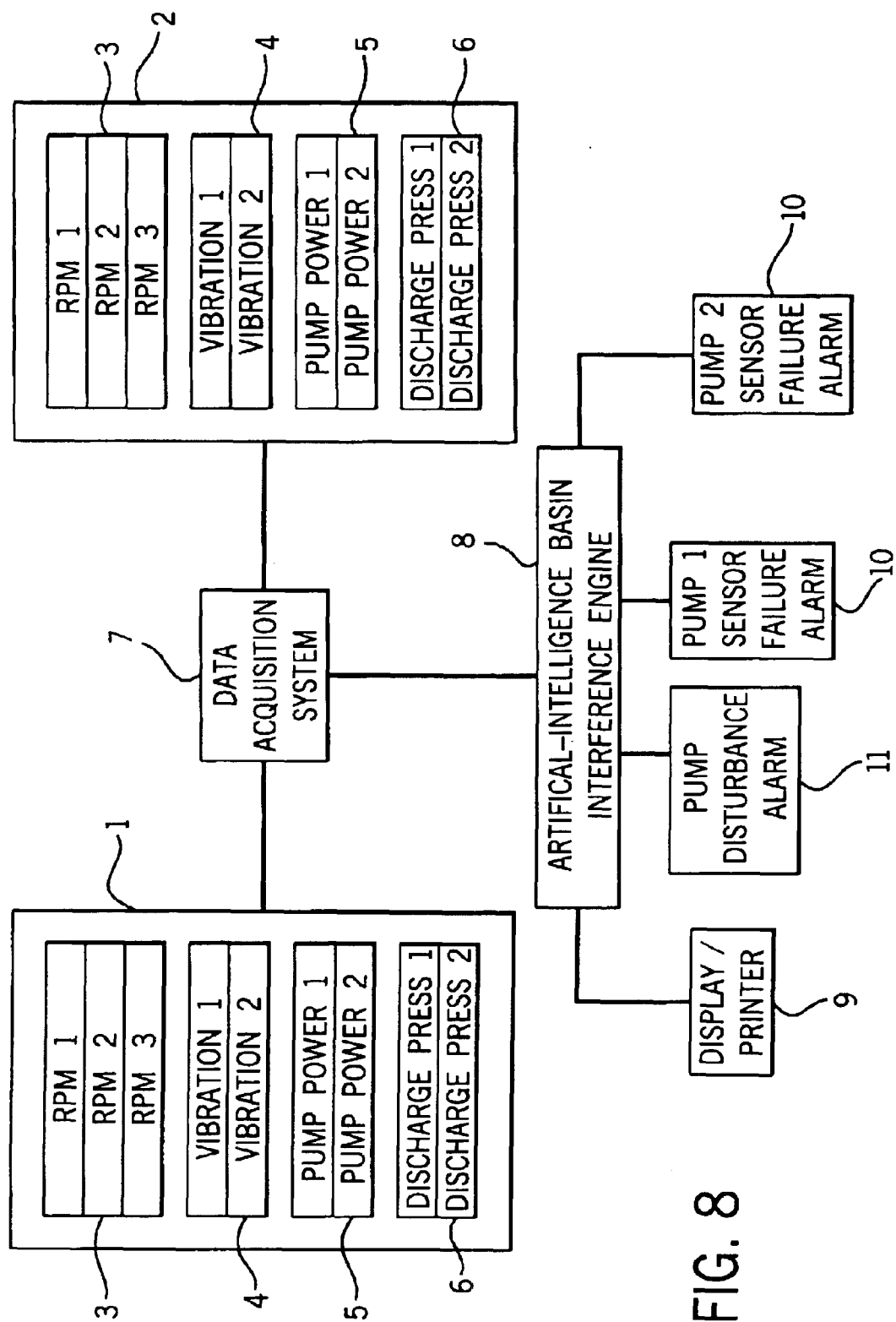
FIG. 8 is a representation of an expert system for online surveillance of a set of nuclear reactor coolant pumps.

FIG. 8. illustrates the architecture of the expert system for an online pump-surveillance system. The two coolant pumps 1 and 2 are each equipped with numerous sensors 3–6. A typical sensor arrangement is depicted in FIG. 8 where seven sensors are employed: three sensors 3 which monitor the rotor shaft speed, two accelerometers 4 which monitor the mechanical vibration of the pump, a pump power measuring device 5 which measures the power needed by the motor to turn the rotor, and a discharge pressure transducer 6 which measures the flow rate of coolant through the pump. The information from the sensors 3–6 is transmitted to the data acquisition system 7 (DAS) which then interfaces with the artificial intelligence (AI) based inference engine 8. The AI inference engine 8 implements an operability logic algorithm illustrated in FIG. 7. The AI software for the inference engine 8 is supported by a layer of utility routines which perform generic functions such as loading external tables, providing access to shared knowledge base, activating inter-process synchronization, and performing network communication. Output from the AI engine 8 is integrated to a color-graphics display 9 in the reactor room and is multiplexed back to the data acquisition system 7 for archive backup storage. If the inference engine 8 detects a degradation in the pump or its sensors, a pump sensor failure alarm 10 or a pump disturbance alarm 11 is sounded.

FIG. 7 illustrates a flow chart for determining the condition of the cooling pumps through the employment of a sequence of mathematical algorithms associated with a series of sequential probability ratio test (SPRT) modules. The input signals 12 are acted on mathematically by a sensitive pattern recognition technique, the sequential probability ratio test (SPRT). The use of the SPRT technique through several "if-then" steps provides for early annunciation of sensor operability or degradation of the coolant pump. Each of the modules 13, 14, 15, and 16 employs the SPRT technique to determine the condition of the respective sensors for the purpose of determining whether a problem is sensor or pump related. The modules present in the expert system include a shaft speed SPRT module 13, a vibration level SPRT module 14, a power signal SPRT module 15, and a discharge pressure SPRT module 16. Each SPRT module is connected to an audible alarm 17 which is sounded when a sensor degradation is determined. If no sensor degradation is determined the degradation is determined to be due to the pump, and the pump disturbance alarm 11 sounds.

The various recited SPRT modules monitor and compare the signals from two similar sensors which respond to a single parameter representing a physical condition associated with the pump. The purpose of this comparison is to identify subtle changes in the statistical quality of the noise associated with either signal when compared one to the other. In applications involving two or more reactor coolant pumps equipped with identical sensors, a SPRT monitor applied to the pumps will provide a sensitive annunciation of any physical disturbance affecting one of the pumps. If each of the pumps had only one sensor, it would be difficult for the SPRT technique to distinguish between a pump degradation event and a degradation of the sensor itself. However, when each pump is equipped with multiple, redundant sensors, the SPRT technique can be applied to pairs of sensors on each individual pump for sensor-operability verification.

As is illustrated in the logic diagram of FIG. 7, the expert system is synthesized as a collection of "if-then" type rules. Each SPRT module processes and compares the stochastic components of the signals from two sensors that are ostensibly following the same physical process. If any physical disturbance causes the noise characteristics for either signal to change, that is, a larger variance, skewness, or signal bias, then the SPRT technique provides a sensitive and rapid annunciation of that disturbance while minimizing the probabilities of both false alarms and missed alarms.

The processor 18, of module 13, first interrogates the signals N1 and N2, representing the mean shaft speed for the coolant pumps 1 and 2, respectively. The mean shaft speed signal is obtained by averaging the outputs of the three RPM sensors 3 on each of the pumps 1 and 2. If a problem is identified in the comparison of N1 and N2, a sequence of SPRT tests is invoked to validate the three sensors on the pump 1, signified by A1, B1, and C1. If one of those sensors is identified as degraded, an audible alarm 11 is actuated. If the three sensors on pump 1 are found to be operating within tolerance, then the three corresponding sensors on the pump 2 are tested. If all six sensors are confirmed to be operational, execution is passed to the next SPRT module which in this case is the SPRT module 14 which tests the vibration-level variable. If these sensors are found to be operational, then the testing is functionally shifted to the module 15 the power-signal variable, and then if it is found to be functioning properly to the module 16 the discharge-pressure variable. This sequential organization is illustrated in FIG. 7. If a problem is identified in any module, an audible alarm, 10, 11 or 17 is sounded in the reactor control room, and the operator can initiate a manual shutdown of the reactor to repair the identified problem.

The objective of the AI engine in the expert system is to analyze successive observations of a discrete process Y which represents a comparison of the stochastic components of two physical processes monitored by similar sensors. Let $y_k$ represent a sample from the process Y at time t. During normal operations with an undergraded physical system and with sensors that are functioning within specifications, the $y_{kj}$ should be normally distributed with means 0. If the two signals being compared do not have the same nominal means due, for example, to differences in calibration, then the input signals will be pre-normalized to the same nominal mean values during initial operation.

The specific goal of the A1 engine is to declare system 1 or system 2 degraded if the drift in Y is sufficiently large that the sequence of observations appears to be distributed about means $+M$ or $-M$, where M is a preassigned system distribution magnitude. The SPRT provides a quantitative framework that enables us to decide between two hypotheses, H and H2, namely:

H1: Y is drawn from a Gaussian product distribution function (PDF) with means M and variance $\sigma^2$.

H2: Y is drawn from a Gaussian PDF with mean 0 and variance $\sigma^2$.

If it is supposed that H1 or H2 is true, we wish to decide for H1 or H2 with probability $(1-\beta)$ or $(1-\alpha)$ respectively, where $\alpha$ and $\beta$ represent the error (misidentification) probabilities.

From the theory described by Wald and Wolfowitz in "Optimum Character of the Sequential Probability Ratio Test," Ann. Math. Stat., 19,326 (1948), the most powerful test depends on the likelihood ratio $1_n$, where Probability of observed sequence given H1 true.

$$l_n = \frac{y_1, y_2, \ldots, y_n}{y_1, y_2, \ldots, y_n}$$

Probability of observed sequence given H2 true.

After n observations have been made, the sequential probability ratio is just the product of the probability ratio is just the product of the probability ratios for each step:

$$l_n = (PR1) \cdot (PR2) \cdot (PR3) \cdot \ldots (PR_n)$$

or $$l_n = \prod_{i=1}^{n} \frac{f(y_i \mid H_1)}{f(y_i \mid H_2)}$$

where $F(y_i|H)$ is the distribution of the random variables y. the Wald-Wolfowitz theory operates as follows:

Continue sampling as long as $$A < 1_n < B \tag{1}$$

Stop sampling and decide H1 as soon as $1_n \geq B$, and stop sampling and decide H2 as soon as in $1_n \leq A$. The acceptance thresholds are related to the error (misidentification) probabilities by the following expressions.

$$A = \frac{\beta}{1-\alpha} \text{ and } \beta = \frac{1-\beta}{\alpha} \tag{2}$$

where $\alpha$=probability of accepting H2 when H2 is true (false alarm probability)

$\beta$=probability of accepting H2 when H1 is true (missed alarm probability)

Assuming the random variable $y_k$ is normally distributed, the likelihood that H1 is true (mean M, variance $\sigma^2$) is given by $$L(y_1, y_2, y_3 \ldots y_n \mid H1) = \tag{3}$$

$$\frac{1}{(2\pi)^{n/2}\sigma^2} \exp\left[-\frac{1}{2\sigma^2}\left(\sum_{k=1}^{n} y_k^2 - 2\sum_{k=1}^{n} y_k M = \sum_{k=1}^{n} M^2\right)\right].$$

Similarly for H2 (means o, variance $\alpha^2$), $$L(y_1, y_2, y_3 \ldots y_n \mid H2) = \frac{1}{(2\pi)^{n/2}\sigma^n} \exp\left(-\frac{1}{2\sigma^2}\sum_{k=1}^{n} y_k^2\right) \tag{4}$$

The ratio of equations (3) and (4) gives the likelihood ratio $1_n$; where $1_n$ is expressed as $$l_n = \exp\left[-\frac{1}{2\sigma^2}\sum_{k=1}^{n} M(m - 2y_k)\right] \tag{5}$$

combining equations 1, 2 and 5, and taking the natural logs, gives $$\ln[\beta/(1-\alpha)] > -\frac{1}{2\sigma^2}\sum_{k=1}^{n} M(M - 2y_k) < \ln[(1-\beta)\alpha]$$

where $$SPRT = -\frac{1}{2\sigma^2}\sum_{k=1}^{n} M(M - 2y_k) \text{ or}$$

then the sequential sampling and decision strategy can be concisely represented as If SPRT $\leq \ln(\beta/1-\alpha)$ accept H2

If $\ln[\beta/(1-\alpha)] < \text{SPRT} < \ln[(1-\beta)/\alpha]$, continue sampling If SPRT≧In[(1−β/α]accept H1.

The SPRT analysis formulated here cannot be applied directly to non-Gaussian signals. For applications to nuclear system signals contaminated by non-Gaussian noise, an attempt should first be made to pretreat the input signals with a normalizing transformation.

For applications where (a) one requires a high degree of assurance that a system is functioning within specifications and (b) there is not a large penalty associated with false alarms, it is not uncommon to specify a B (missed alarm probability) that is much smaller than A (false alarm probability). In safety critical systems one may be more willing to incur a false alarm than a missed alarm. For applications where a large cost penalty is incurred with any false alarms, it is desirable to keep both A and B small.

The trade-off that must be considered before one specifies arbitrarily small values for A and B is the effect this may have on the sensitivity and maximum decision time needed by the SPRT to annunciate a disturbance. The desired sensitivity of the SPRT is fixed by specification of M, the system disturbance magnitude. For a given value of M, the average sample number required to reach a decision is influenced by A and B and also by the variance associated with the signals being monitored. It takes longer to identify a subtle change in a process characterized by a low signal-to-noise ratio than in one with a high signal-to-noise ratio.

The non-stationary version of the SPRT algorithm is a slightly modified version of Wald's SPRT. In the non-stationary case, the failure magnitude, M, reference signal $$SPRT(n) = SPRT(n-1) + \frac{M(n)}{\sigma^2(n)}\left((y(n) - \mu(n)) - \frac{M(n)}{2}\right),$$

(or mean), $\mu$, and the reference variance, $\sigma$, are sample dependent. Therefore, the non-stationary SPRT equation becomes
where n=1,2, . . . ,L and L is the length of the length equalized signals. In this case, y(n) is the length of the equalized monitored signal, $\mu(n)$ is the corresponding reference signal generated during the training phase and $\sigma(n)$ is the variance of each point in $\mu(n)$.

Figure 9:
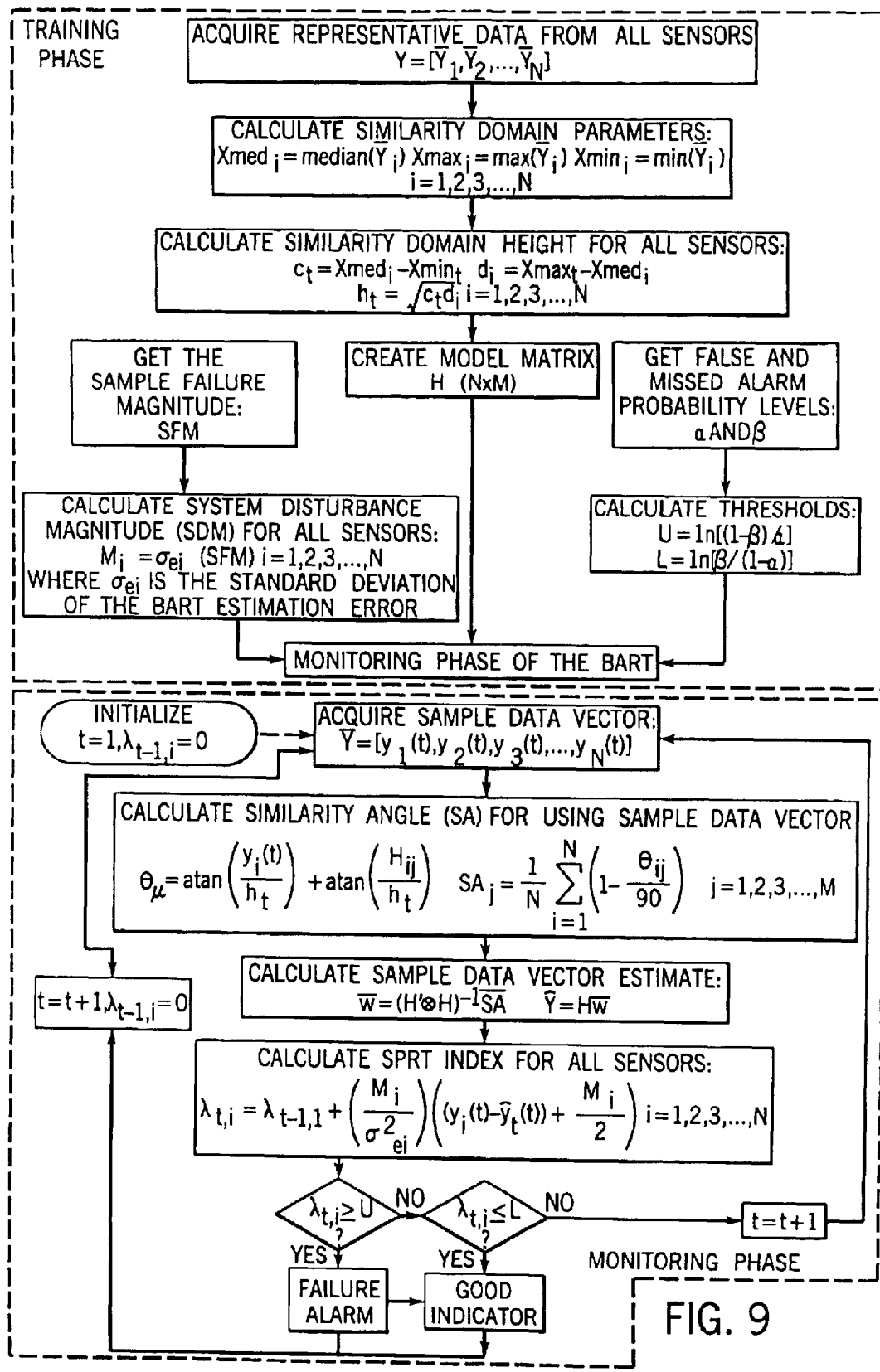
FIG. 9 is an illustration of a flow diagram of a bounded angle ratio test method of data analysis.

The bounded angle ratio test (hereinafter BART) mentioned above is employed in systems with more than two variables, as shown in FIG. 9. For example, BART can be used on an actual sensor signal exhibiting non-white characteristics, such as for example, on sensor signals from the primary pump #2 of the EBR-II nuclear reactor at Argonne National Laboratory (West) in Idaho. In such a case, the signal can be a measure of the pump's speed over a given amount of time. In such a situation, one can use a nonlinear multivariate regression technique that employs an N Dimensional Space (known in vector calculus terminology as hyperspace) to model the relationships between all of the variables. This regression procedure results in a nonlinear synthesized estimate for each input observation vector based on the hyperspace regression model. The nonlinear multivariate regression technique is centered around the hyperspace BART operator that determines the element by element and vector to vector relationships of the variables and observation vectors, given a set of system data that is recorded during a time period when everything is functioning correctly.

In the BART method described in FIG. 9., the method is also split into a training phase and a monitoring phase. The first step in the training phase is to acquire a data matrix continuing data samples from all of the sensors (or data sources) used for monitoring the system that are coincident in time and are representative of normal system operation. Then the BART parameters are calculated for each sensor ($X_{med}$, $X_{max}$ and $X_{min}$). Here $X_{med}$ is the median value of a sensor. The next step is to determine the similarity domain height for each sensor (h) using the BART parameters $X_{med}$, $X_{max}$ and $X_{min}$. Once these parameters are calculated a subset of the data matrix is selected to create a model matrix (H) that is used in the BART estimation calculations. Here, H is an N×M matrix where N is the number of sensors being monitored and M is the number of observations stored from each sensor. The last steps taken during the training phase are the SPRT parameters calculations. The calculations are analogous to the calculations in the other methods, except that now the standard deviation value used to calculate SDI is obtained from BART estimation errors from each sensor (or data source) under normal operating conditions.

During the BART monitoring phase, a sample vector is acquired at each time step t, that contains a reading from all of the sensors (or data sources) being used. Then the similarity angle (SA) between the sample vector and each sample vector stored in H is calculated. Next an estimate of the input sample vector Y is calculated using the BART estimation equations. The difference between the estimate and the actual sensor values is then used as input to the SPRT module. Each difference is treated separately so that a decision can be made on each sensor independently. This method is described in more detail hereinafter.

In this preferred embodiment of FIG. 9 of the invention, the method measures similarity between scalar values. BART uses the angle formed by the two points under comparison and a third reference point lying some distance perpendicular to the line formed by the two points under comparison. By using this geometric and trigonometric approach, BART is able to calculate the similarity of scalars with opposite signs.

In the most preferred form of BART an angle domain must be determined. The angle domain is a triangle whose tip is the reference point (R), and whose base is the similarity domain. The similarity domain consists of all scalars which can be compared with a valid measure of similarity returned. To introduce the similarity domain, two logical functional requirements can be established:
0 The similarity between the maximum and minimum values in the similarity domain is 0, and
1 the similarity between equal values is 1.
Thus the similarity range (i.e. all possible values for a measure of similarity), is in the range 0 to 16 inclusive.

BART also requires some prior knowledge of the numbers to be compared for determination of the reference point (R). Unlike a ratio comparison of similarity, BART does not allow "factoring out" in the values to be compared. For example, with the BART methodology the similarity between 1 and 2 is not necessarily equal to the similarity between 2 and 4. Thus, the location of R is vital for good relative similarities to be obtained. R lies over the similarity domain at some distance h, perpendicular to the domain. The location on the similarity domain at which R occurs ($X_{med}$) is related to the statistical distribution of the values to be compared. For most distributions, the median or mean is sufficient to generate good results. In a preferred embodiment the median is used since the median provides a good measure of data density and is resistant to skewing caused by large ranges of data.

Figure 10:
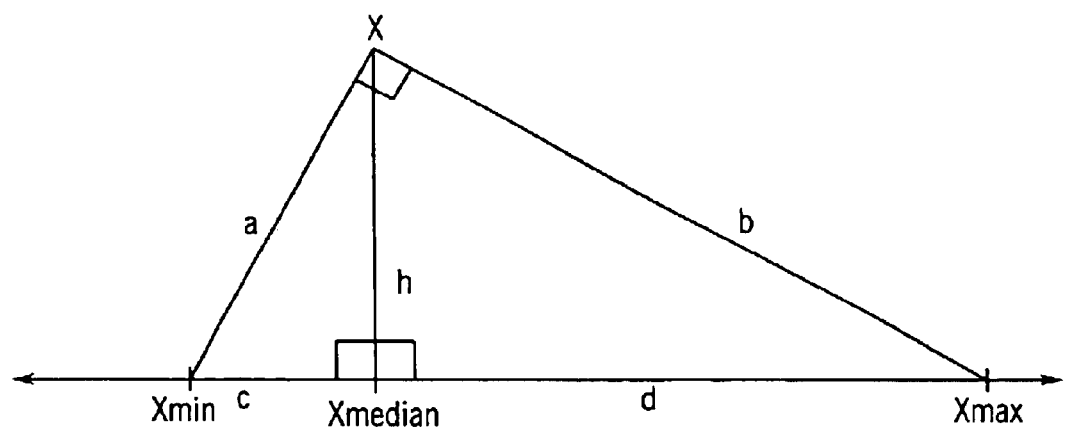
FIG. 10 is an illustration of conditions and values for carrying out a bounded angle ratio test.

Once $X_{med}$ has been determined, it is possible to calculate h. In calculating h, it is necessary to know the maximum and minimum values in the similarity domain. ($X_{max}$ and $X_{min}$ respectively) for normalization purposes the angle between $X_{min}$ and $X_{max}$ is defined to be 90°. The conditions and values defined so far are illustrated in FIG. 10. From this triangle it is possible to obtain a system of equations and solve for h as shown below:

$$c = X_{med} - X_{min}$$

$$d = X_{max} - X_{med}$$

$$a^2 = c^2 + h^2 \quad (19)$$

$$b^2 = d^2 + h^2$$

$$(c+d)^2 = a^2 + b^2$$

$$(c+d)^2 = c^2 + d^2 + 2h^2$$

$$h^2 = cd$$

$$h = \sqrt{cd}$$

Figure 11:
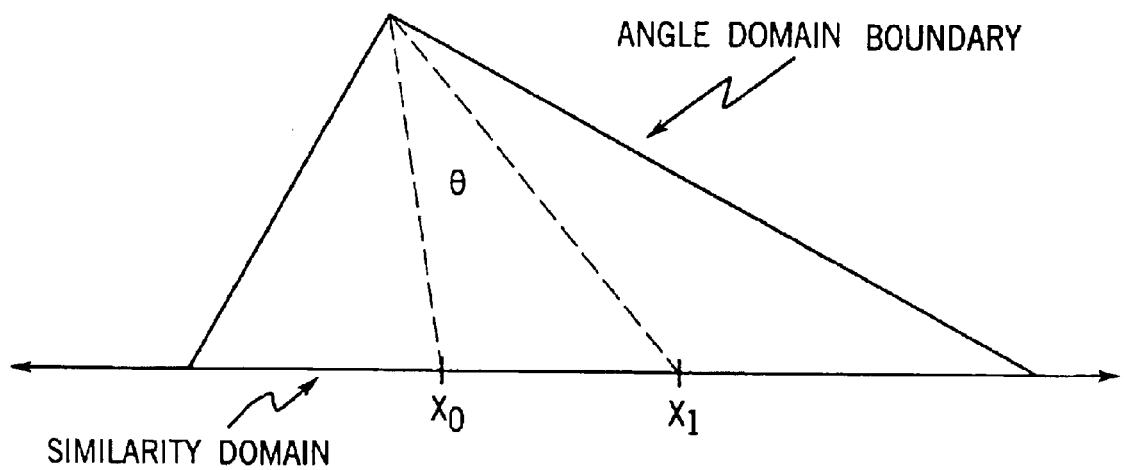
FIG. 11 is an illustration of conditions for comparing similarity of two points X0 and X1 on the illustration of FIG. 10.
Figure 12:
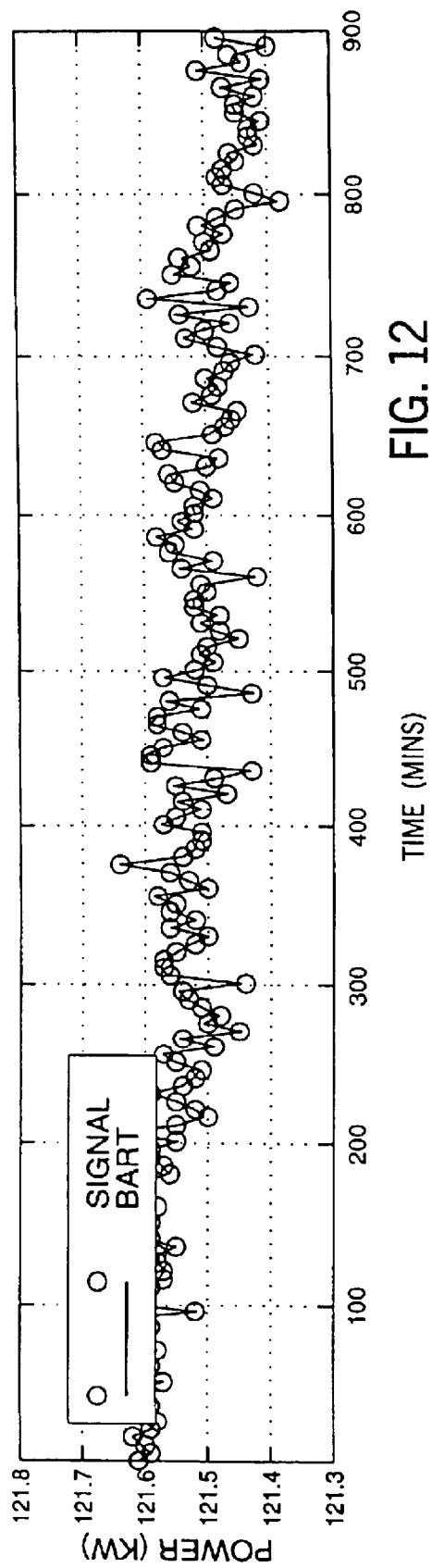
FIG. 12 shows EBR-II channel 1, primary pump 1, power under normal operational conditions, and modelled BART.
Figure 13:
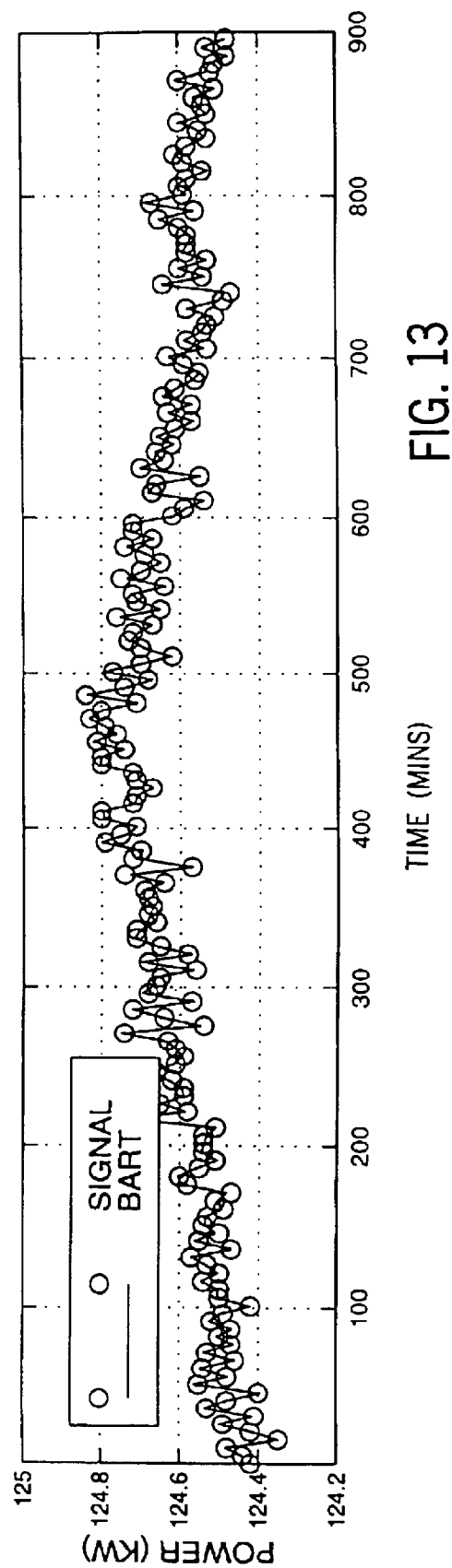
FIG. 13 shows EBR-II channel 2, primary pump 2, power under normal operational conditions, and modelled BART.
Figure 14:
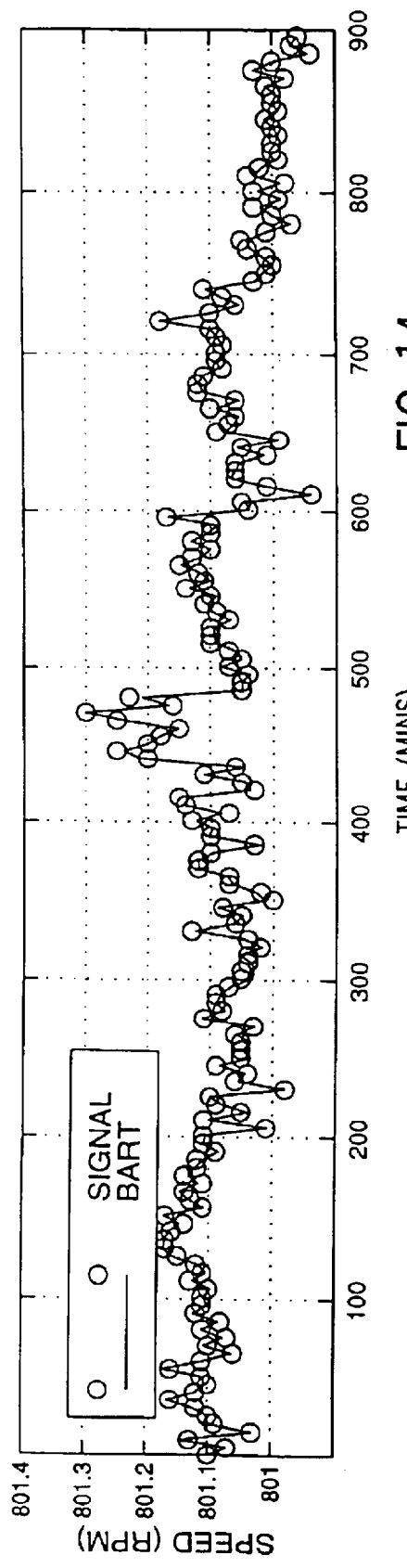
FIG. 14 shows EBR-II channel 3, primary pump 1, speed under normal operating conditions and modelled BART.
Figure 15:
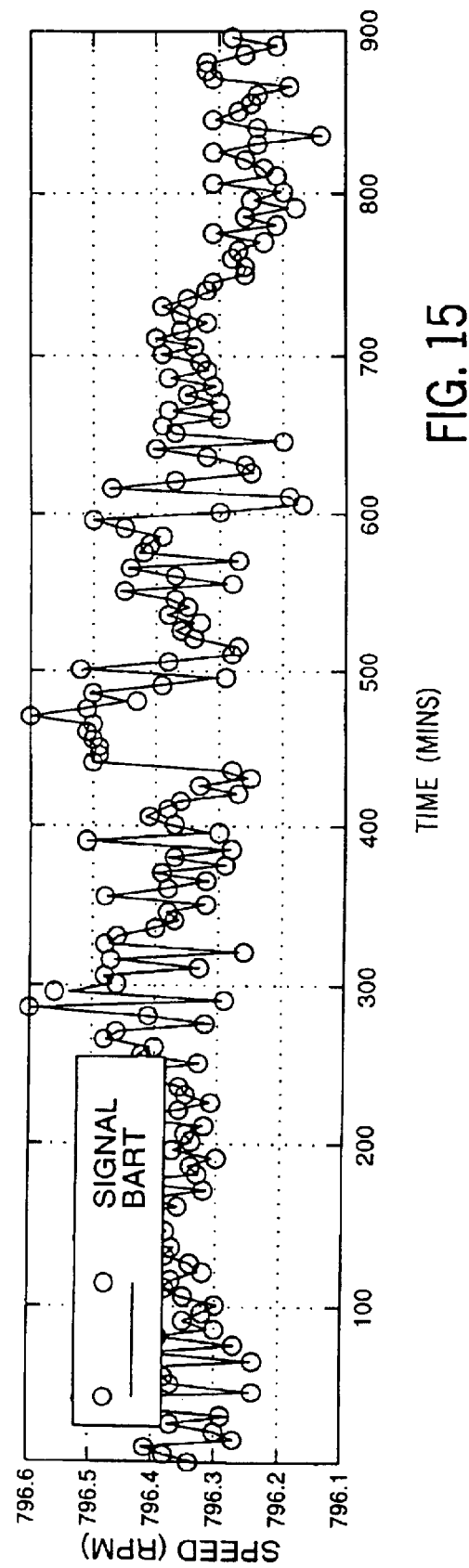
FIG. 15 shows EBR-II channel 4, primary pump 2, speed under normal operating conditions and modelled BART.
Figure 16:
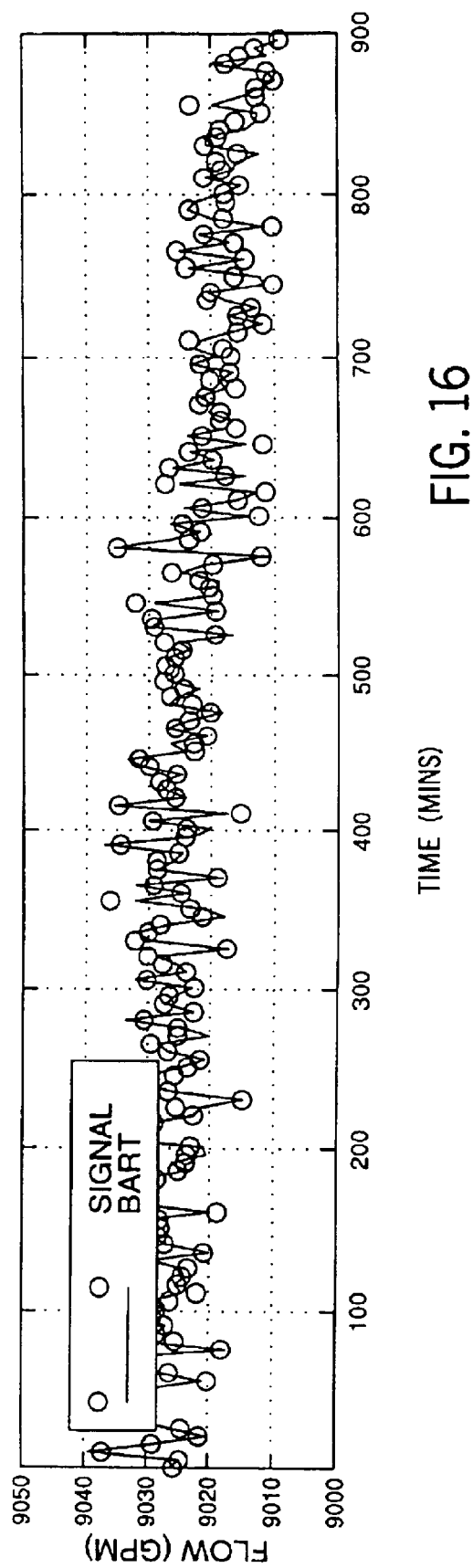
FIG. 16 shows channel 5 reactor outlet flow rate under normal operating conditions and modelled BART.
Figure 17:
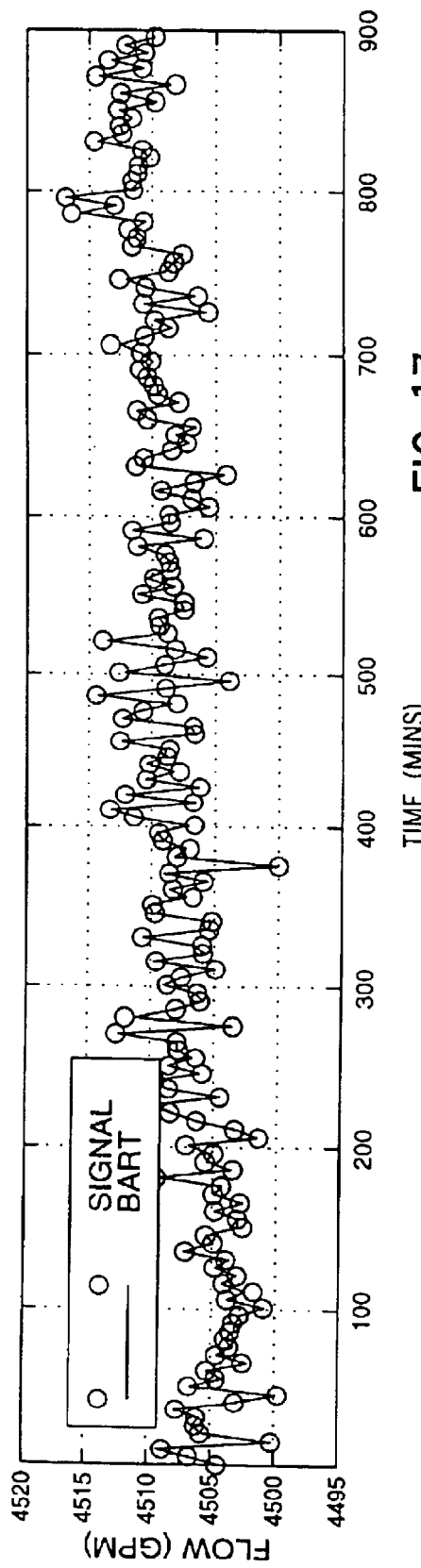
FIG. 17 shows EBR-II channel 6, primary pump 2, flow rate under normal conditions and modelled BART.
Figure 18:
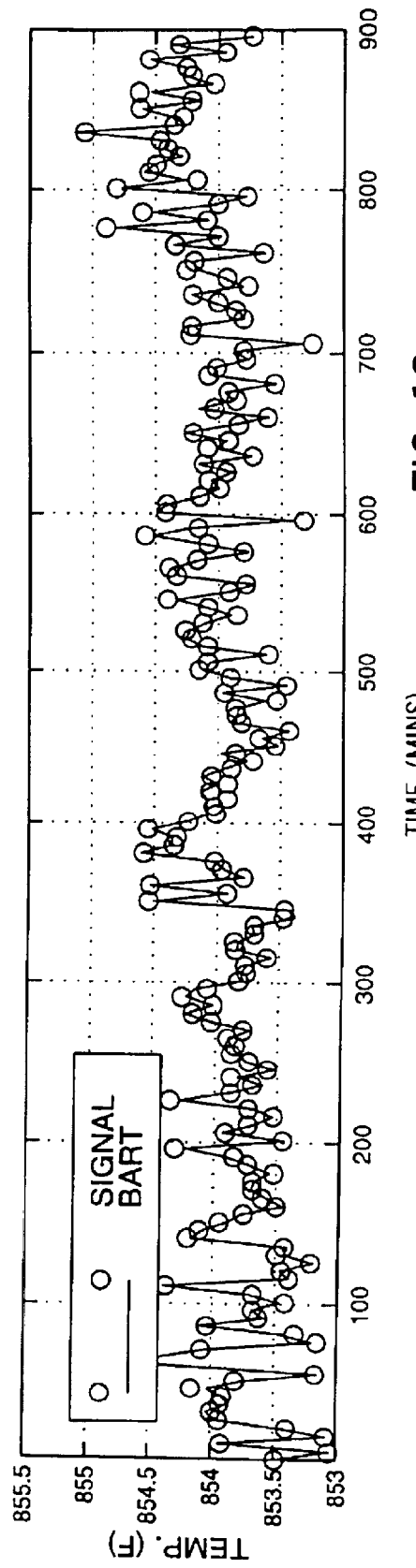
FIG. 18 shows EBR-II channel 7 subassembly outlet temperature 1A1 under normal operating conditions and modelled BART.
Figure 21:
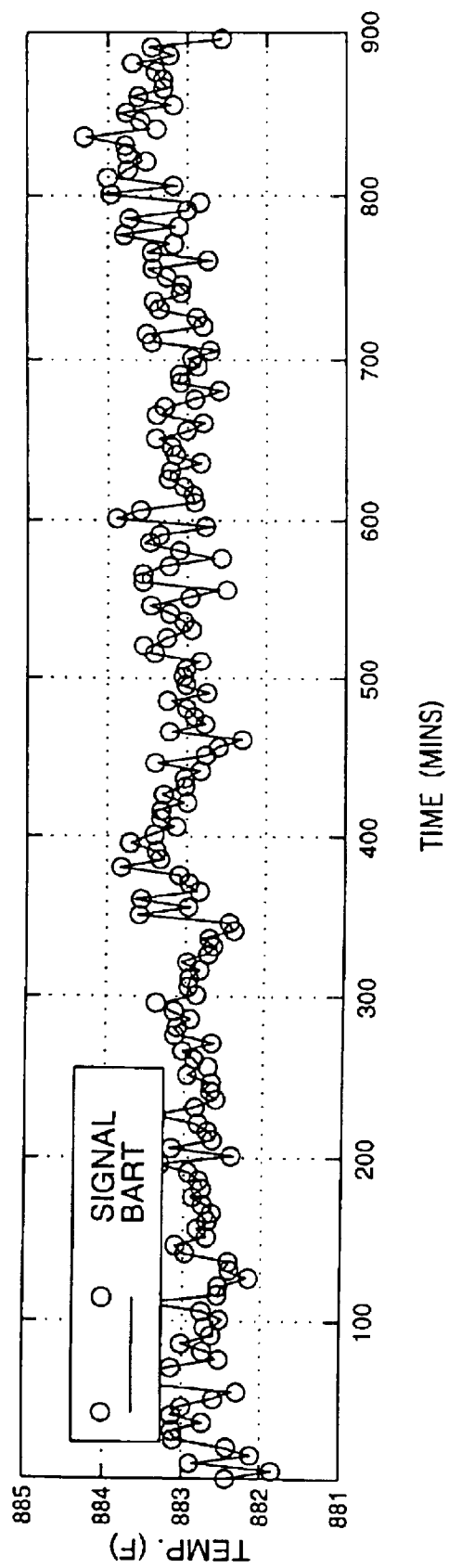
FIG. 21 illustrates channel 10 subassembly outlet temperature 4F1 under normal operating conditions and modelled BART.

Once h has been calculated the system is ready to compute similarities. Assume that two points: $X_0$ and $X_1$ ($X_0 \leq X_1$) are given as depicted in FIG. 11 and the similarity between the two is to be measured. The first step in calculating similarity is normalizing $X_0$ and $X_1$ with respect to $X_{med}$. This is done by taking the euclidean distance between $X_{med}$ and each of the points to be compared. Once $X_0$ and $X_1$ have been normalized, the angle <$X_0RX_1$ (hereinafter designated θ) is calculated by the formula:

$$\theta = \text{ArcTan}(X_1/h) = \text{ArcTan}(X_0/h) \quad (20)$$

After θ has been found, it must be normalized so that a relative measure of similarity can be obtained that lies within the similarity range. To ensure compliance with functional requirements (A) and (B) made earlier in this section, the relative similarity angle (SA) is given by:

$$SA = 1 - \frac{\theta}{90°} \quad (21)$$

Formula (21) satisfies both functional requirements established at the beginning of the section. The angle between $X_{min}$ and $X_{max}$ was defined to be 90°, so the similarity between $X_{min}$ and $X_{max}$ is 0. Also, the angle between equal values is 0°. The SA therefore will be confined to the interval between zero and one, as desired.

To measure similarity between two vectors using the BART methodology, the average of the element by element SAs are used. Given the vectors $x_1$ and $x_2$ the SA is found by first calculating $S_i$ for i=1,2,3. . . n for each pair of elements in $x_1$ and $x_2$ i.e., if $\underline{x_1} = [X_{11} X_{12} X_{13} \ldots X_{1n}]$ and $\underline{x_2} = [X_{21} X_{22} X_{23} \ldots X_{2n}]$ The vector SA $\underline{\Gamma}$ is found by averaging over the $S_i$'s and is given by the following equation.

$$\Gamma = \frac{1}{n} \sum_{i=1}^{N} S_i \quad (22)$$

In general, when given a set of multivariate observation data from a process (or other source of signals), linear regression could be used to develop a process model that relates all of the variables in the process to one another. An assumption that must be made when using linear regression is that the cross-correlation information calculated from the process data is defined by a covariance matrix. When the cross-correlation between the process variables is nonlinear, or when the data are out of phase, the covariance matrix can give misleading results. The BART methodology is a non-linear technique that measures similarity instead of the traditional cross-correlation between variables. One advantage of the BART method is that it is independent of the phase between process variables and does not require that relationships between variables be linear.

If there is a random observation vector $\underline{y}$ and a known set of process observation vectors from a process P, it can be determined if $\underline{y}$ is a realistic observation from a process P by combining BART with regression to form a nonlinear regression method that looks at vector SAs as opposed to euclidean distance. If the know observation vectors taken from P are given by $$H = \begin{bmatrix} \begin{pmatrix} h_{11} \\ h_{21} \\ h_{31} \\ \vdots \\ h_{k1} \end{pmatrix} \begin{pmatrix} h_{12} \\ h_{22} \\ h_{32} \\ \vdots \\ h_{k2} \end{pmatrix} \cdots \begin{pmatrix} h_{1m} \\ h_{2m} \\ h_{3m} \\ \vdots \\ h_{km} \end{pmatrix} \end{bmatrix} \quad (23)$$

$$= [\underline{h_1} \ \underline{h_2} \ \cdots \ \underline{h_m}]$$

where H is k by m (k being the number of variables and m the number of observations), then the closest realistic observation vector to $\underline{y}$ in process P given H is given by $$\underline{y} = H\underline{w} \quad (24)$$

Here $\underline{w}$ is a weighting vector that maps a linear combination of the observation vectors in H to the most similar representation of $\underline{y}$. The weighting vector $\underline{w}$ is calculated by combining the standard least squares equation form with BART. Here $\oplus$ stands for the SA operation used in BART.

$$\underline{w} = (H' \oplus H)^{-1} H' \oplus \underline{y} \quad (25)$$

An example of use of the BART methodology was completed by using 10 EBR-II sensor signals. The BART system was trained using a training data set containing 1440 observation vectors. Out of the 1440 observation vectors, 129 of these were chosen to be used to construct a system model. The 129 vectors were also used to determine the height, h, of the angle domain boundary as well as the location of the BART reference point R for each of the sensors used in the experiment. To test the accuracy of the model 900 minutes of one minute data observation vectors under normal operating conditions were run through the BART system. The results of the BART system modeling accuracy are shown in FIGS. 12–16 and FIGS. 17–21 (BART modeled). The Mean Squared Errors for each of the sensor signals is shown in Table III.

TABLE III

BART System Modeling Estimation Mean Squared Errors for EBR-II Sensor Signals

| Sensor Channel | Sensor Description | MSE of Estimation Error | Normalized MSE (MSE/$H_3$) | Normalized MSE (MSE/$o_3$) |
|---|---|---|---|---|
| 1. | Primary Pump #1 Power (KW) | 0.0000190 | 0.0000002 | 0.0002957 |
| 2. | Primary Pump #2 Power (KW) | 0.0000538 | 0.0000004 | 0.0004265 |
| 3. | Primary Pump #1 Speed (RPM) | 0.0000468 | 0.0000001 | 0.0005727 |
| 4. | Primary Pump #2 Speed (RPM) | 0.0000452 | 0.0000001 | 0.0004571 |
| 5. | Reactor Outlet Flowrate (GPM) | 8.6831039 | 0.0009670 | 0.1352974 |
| 6. | Primary Pump #2 Flowrate (GPM) | 0.0571358 | 0.0000127 | 0.0163304 |
| 7. | Subassembly Outlet Temperature 1A1 (F) | 0.0029000 | 0.0000034 | 0.0062368 |
| 8. | Subassembly Outlet Temperature 2B1 (F) | 0.0023966 | 0.0000027 | 0.0052941 |
| 9. | Subassembly Outlet Temperature 4E1 (F) | 0.0025957 | 0.0000029 | 0.0050805 |
| 10. | Subassembly Outlet Temperature 4F1 (F) | 0.0024624 | 0.0000028 | 0.001358 |

Figure 22C:
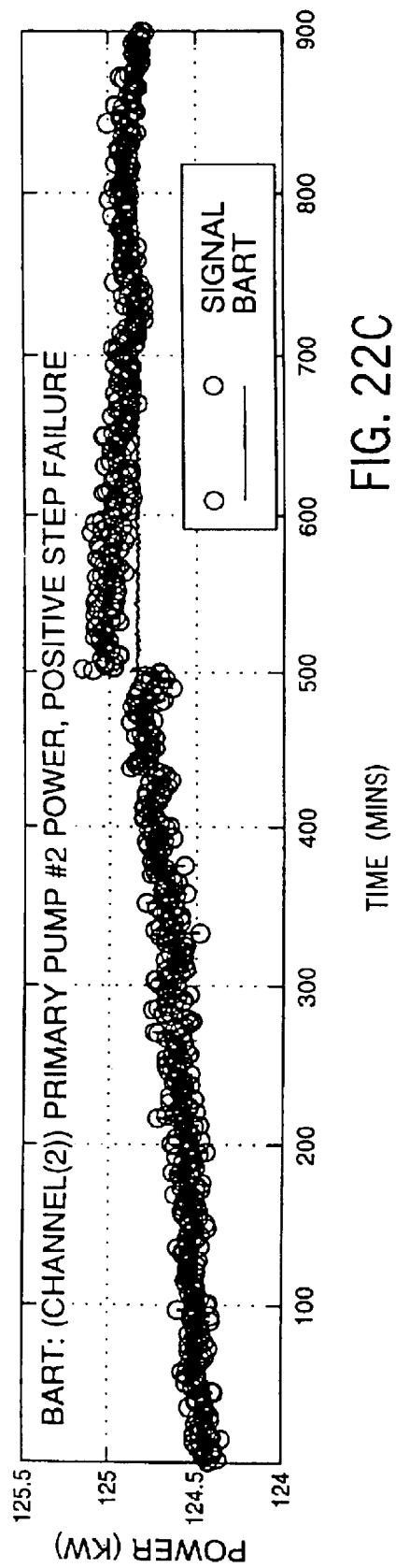
FIG. 22C shows an EBR-II primary pump power signal with an imposed positive step function.
Figure 22D:
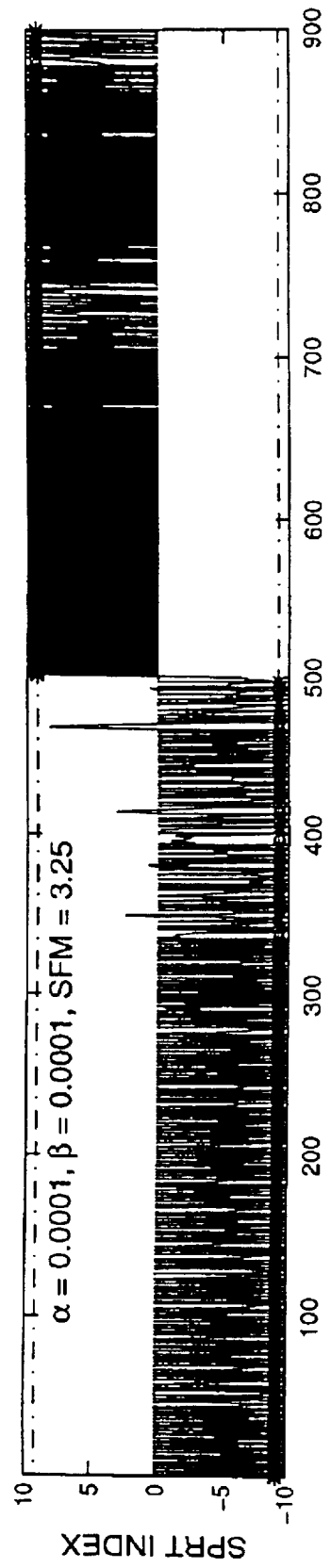
FIG. 22D shows an application of SPRT to the signals of FIG. 22C.
Figure 22E:
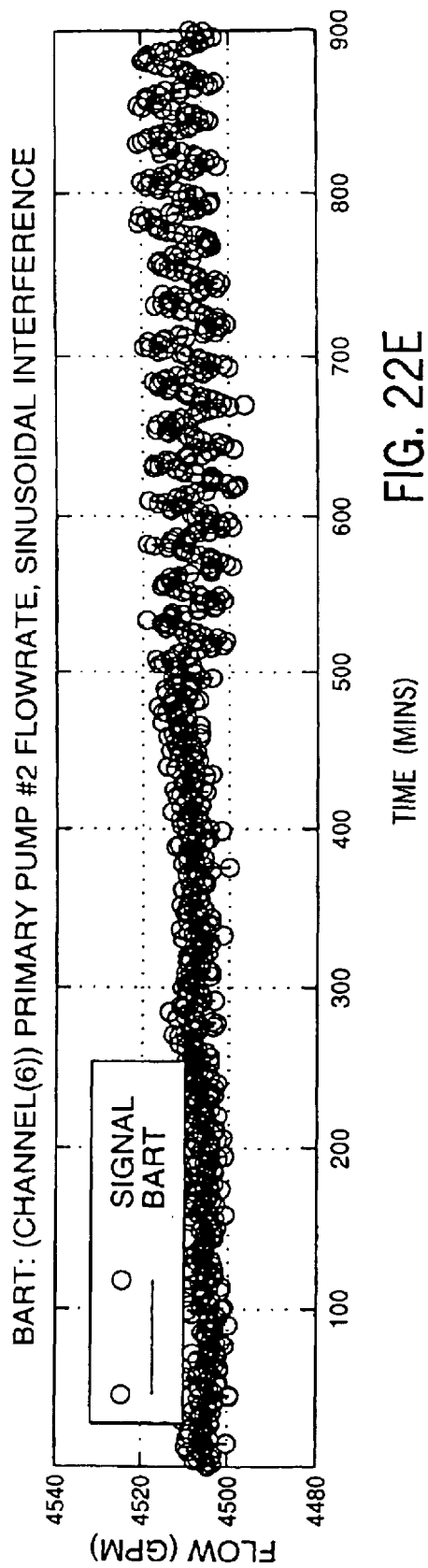
FIG. 22E shows an EBR-II primary pump power signal with an imposed sinusoidal disturbance.
Figure 22F:
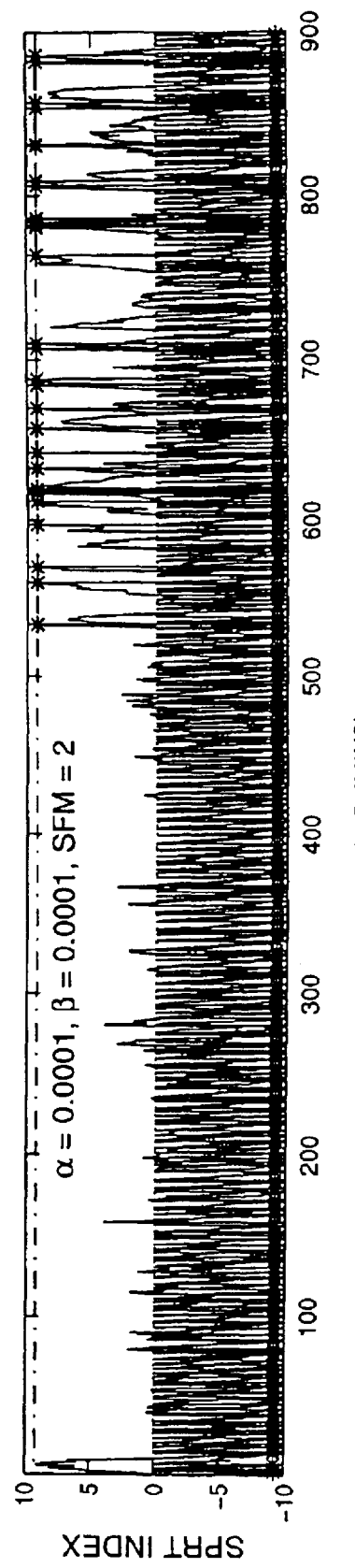
FIG. 22F shows an application of SPRT to the signal of FIG. 22E.

A second example shows the results of applying BART to ten sensors signals with three different types of disturbances with their respective BART estimates superimposed followed by the SPRT results when applied to the estimation error signals. The first type of disturbance used in the experiment was a simulation of a linear draft in channel #1. The drift begins at minute 500 and continues through to the end of the signal, reaching a value of 0.21% of the sensor signal magnitude and the simulation is shown in FIG. 22A. The SPRT (FIG. 2B) detects the drift after it has reached a value of approximately 0.06% of the signal magnitude. In FIG. 22C a simulation of a step failure in channel #2 is shown. Here the step has a height of 0.26% of the signal magnitude and begins at minute 500 and continues throughout the signal. FIG. 22D shows the SPRT results for the step failure. The SPRT detects the failure immediately after it was introduced into the signal. The last simulation was that of a sinusoidal disturbance introduced into channel #6 as shown in FIG. 22E. The sinusoid starts at minute 500 and continues throughout the signal with a constant amplitude of 0.15% of the sensor signal magnitude. The SPRT results for this type of disturbance are shown in FIG. 22F. Again the SPRT detects the failure even though the sinusoid's amplitude is within the operating range of the channel #6 sensor signal.

While preferred embodiments have been shown and described, it should be understood that changes and modifications can be made therein without departing from the invention in its broader aspects. For example, it is possible that signals or waveforms could be measured from processes other than those in the manufacturing or biological fields. Additionally, there are many comparison techniques that could be used to correlate and compare the signals measured according to this invention. Various features of the invention are defined in the following claims.

What is claimed is:

1. A method for monitoring the operating condition of a system characterized by a succession of waveforms, comprising the steps of:
   obtaining a reference waveform having a reference sample count;
   obtaining a monitored waveform from the system;
   resampling the monitored waveform with a digital fractional resampling filter such that the sample count of the monitored waveform matches the reference sample count of the reference waveform; and
   comparing the resampled monitored waveform to the reference waveform to determine the operating condition of the system, wherein the comparing step comprises:
   obtaining variance information for each sample in the reference waveform;
   differencing the reference waveform and the resampled monitored waveform to produce a residual waveform; and
   performing a sequential probability ratio test on a sequence of samples in said residual waveform using the variance information.

2. The method of claim 1, wherein the comparing step comprises a pair-wise comparison of like sample values from each of the resampled monitored waveform and the reference waveform.

3. The method of claim 1, wherein the comparing step comprises comparing the resampled monitored waveform to the reference waveform using a sequential probability ratio test.

4. The method of claim 1, further comprising the step of aligning the resampled monitored waveform with the reference waveform.

5. The method of claim 1, wherein the system comprises an industrial device.

6. A method for monitoring the operating condition of a system characterized by a succession of waveforms, comprising the steps of:
   obtaining a reference waveform having a reference sample count;
   obtaining a monitored waveform from the system;
   resampling the monitored waveform with a digital fractional resampling filter such that the sample count of the monitored waveform matches the reference sample count of the reference waveform;
   aligning the resampled monitored waveform with the reference waveform; and
   comparing the resampled monitored waveform to the reference waveform to determine the operating condition of the system,
   wherein the aligning step includes the use of a bounded angle ratio test.

7. A method for monitoring the operating condition of a system characterized by a succession of waveforms, comprising the steps of:
   obtaining a reference waveform having a reference sample count;
   obtaining a monitored waveform from the system;
   resampling the monitored waveform with a digital fractional resampling filter such that the sample count of the monitored waveform matches the reference sample count of the reference waveform; and comparing the resampled monitored waveform to the reference waveform to determine the operating condition of the system, wherein the system comprises a biological heart.

8. A method for monitoring the operating condition of a system characterized by a succession of signals, comprising the steps of:

using an automated system to define a reference signal having a reference sample count;

using an automated system to obtain a monitored signal from the system;

using an automated system to resample the monitored signal with a digital fractional resampling filter such that the sample count of the monitored signal matches the reference sample count of the reference signal; and using an automated system to compare the resampled monitored signal to the reference signal to determine the operating condition of the system, wherein the comparing step comprises using an automated system to compare the resampled monitored signal to the reference signal using a sequential probability ratio test, and wherein the comparing step further comprises:

determining variance information for each sample in said reference signal;

using an automated system to difference the reference signal and the resampled monitored signal to produce a residual signal; and performing a sequential probability ratio test on a sequence of samples in the residual signal using the variance information.

9. A computer system for monitoring the operating condition of a system characterized by a succession of waveforms, comprising:

computer readable program code means for storing and retrieving a reference waveform having a reference sample count;

computer readable program code means for receiving a monitored waveform from the system;

computer readable program code means for resampling the monitored waveform with a digital fractional resampling filter so that its sample count matches the reference sample count of the reference waveform; and computer readable program code means for comparing the resampled monitored waveform to the reference waveform to determine the operating condition of the system, wherein the comparing means compares the resampled monitored waveform to the reference waveform using a sequential probability ratio test, and wherein the comparing means receives variance information for each sample in said reference waveform, differences the reference waveform and the resampled monitored waveform to produce a residual waveform, and performs a sequential probability ratio test on a sequence of samples in said residual waveform using the variance information.

10. The computer program product according to claim 9, further comprising computer readable program code means for aligning the resampled monitored waveform with the reference waveform.

11. A computer system for monitoring the operating condition of a system characterized by a succession of waveforms, comprising:

computer readable program code means for storing and retrieving a reference waveform having a reference sample count;

computer readable program code means for receiving a monitored waveform from the system;

computer readable program code means for resampling the monitored waveform with a digital fractional resampling filter so that its sample count matches the reference sample count of the reference waveform;

computer readable program code means for aligning the resampled monitored waveform with the reference waveform; and computer readable program code means for comparing the resampled monitored waveform to the reference waveform to determine the operating condition of the system, wherein the aligning means uses a bounded angle ration test.

12. The computer program product according to claim 11, wherein the comparing means performs a pair-wise comparison of like sample values from each of the resampled monitored waveform and the reference waveform.

13. The computer program product according to claim 11, wherein the comparing means compares the resampled monitored waveform to the reference waveform using a sequential probability ratio test.

14. The computer program product according to claim 11, wherein the system comprises a biological system.

15. The computer program product according to claim 11, wherein the system comprises an industrial device.

* * * * *